(12) United States Patent
Lutzki et al.

(10) Patent No.: US 8,096,491 B2
(45) Date of Patent: Jan. 17, 2012

(54) DRIP EMITTER WITH AN INDEPENDENT NON-DRAIN VALVE

(75) Inventors: Moshe Lutzki, Kibbutz Gvat (IL); Zvika Einav, Kibbutz Gvat (IL)

(73) Assignee: Plastro Irrigation Systems Ltd., Kibbutz Gvat (IL)

( * ) Notice: Subject to any disclaimer, the term of this patent is extended or adjusted under 35 U.S.C. 154(b) by 576 days.

(21) Appl. No.: 12/090,454

(22) PCT Filed: Oct. 19, 2006

(86) PCT No.: PCT/IL2006/001207
§ 371 (c)(1),
(2), (4) Date: Jul. 29, 2008

(87) PCT Pub. No.: WO2007/046104
PCT Pub. Date: Apr. 26, 2007

(65) Prior Publication Data
US 2009/0302127 A1    Dec. 10, 2009

(30) Foreign Application Priority Data

Oct. 19, 2005 (IL) .......................................... 171482

(51) Int. Cl.
*B05B 15/00* (2006.01)
*B05B 1/30* (2006.01)
*B05B 1/34* (2006.01)

(52) U.S. Cl. .................... 239/542; 239/547; 239/533.1; 239/571; 239/569

(58) Field of Classification Search .............. 239/533.1, 239/533.13, 542, 547, 571, 575; 137/42–46
See application file for complete search history.

(56) References Cited

U.S. PATENT DOCUMENTS

| | | | | |
|---|---|---|---|---|
| 5,294,058 A | * | 3/1994 | Einav | 239/533.1 |
| 5,332,160 A | * | 7/1994 | Ruskin | 239/542 |
| 5,586,727 A | * | 12/1996 | Shekalim | 239/542 |
| 5,615,838 A | | 4/1997 | Eckstein et al. | |

(Continued)

OTHER PUBLICATIONS

International Search Report for PCT/IL2006/001207 dated Jun. 20, 2008 (3 pages).

(Continued)

*Primary Examiner* — Len Tran
*Assistant Examiner* — James Hogan
(74) *Attorney, Agent, or Firm* — Rodney J. Fuller; Fennemore Craig, P.C.

(57) ABSTRACT

An elastomer membrane based, regulated drip emitter unit, equipped with a non-drip valve, wherein the drip emitter is characterized by that it includes an opening that is exposable to an approximate atmospheric pressure that prevails on the water outlet from the drip emitter; and an additional elastomer membrane portion that is strained and biased against the water inlet opening of the drip emitter for creating a seal with its one side for a non-drain valve and on its other (second) side it is connected to that atmospheric pressure prevailing opening, and wherein the elastomer membrane portion is movable towards that opening in order to open the water inlet opening for enabling a water flow passage from a water supply conduit to the drip emitter, and this from the specific instant that the force exerted by the water pressure prevailing in the water supply conduit on one side of that elastomer portion, overcomes the strain at which that portion was strained and biased against the water inlet opening, as well as the approximate atmospheric pressure that prevails on the other side of that elastomer portion.

7 Claims, 14 Drawing Sheets

U.S. PATENT DOCUMENTS

Figure 1A:
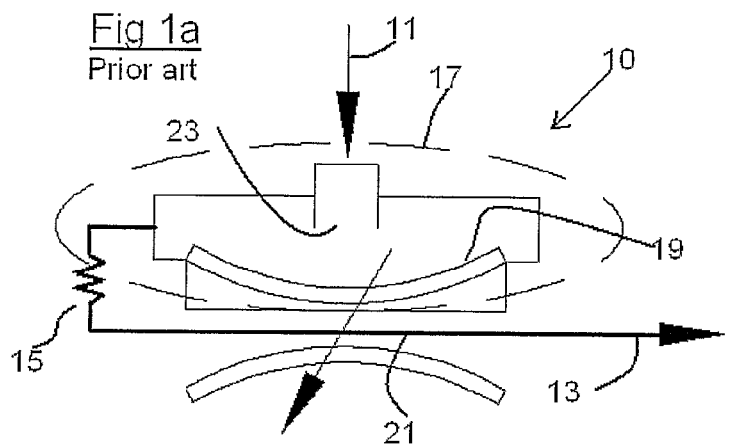

| | | | | |
|---|---|---|---|---|
| 6,206,305 B1 * | 3/2001 | Mehoudar | | 239/542 |
| 6,302,338 B1 * | 10/2001 | Cohen | | 239/542 |
| 6,568,607 B2 * | 5/2003 | Boswell et al. | | 239/542 |
| 6,945,476 B2 * | 9/2005 | Giuffre | | 239/542 |
| 7,648,085 B2 * | 1/2010 | Mavrakis et al. | | 239/542 |
| 7,681,810 B2 * | 3/2010 | Keren | | 239/542 |

OTHER PUBLICATIONS

Written Opinion of the International Searching Authority for PCT/IL2006/001207 dated Jun. 20, 2008 (3 pages).

* cited by examiner

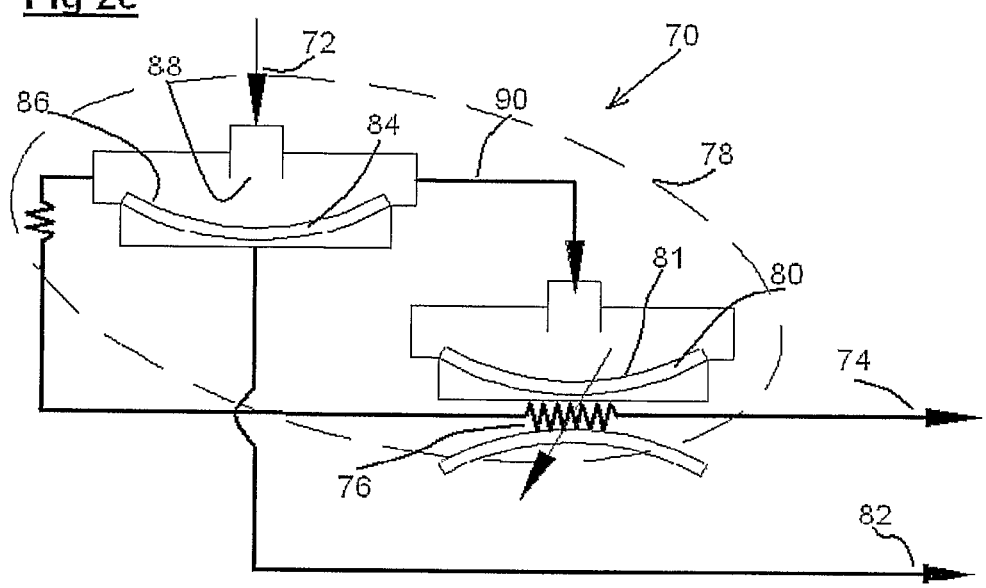

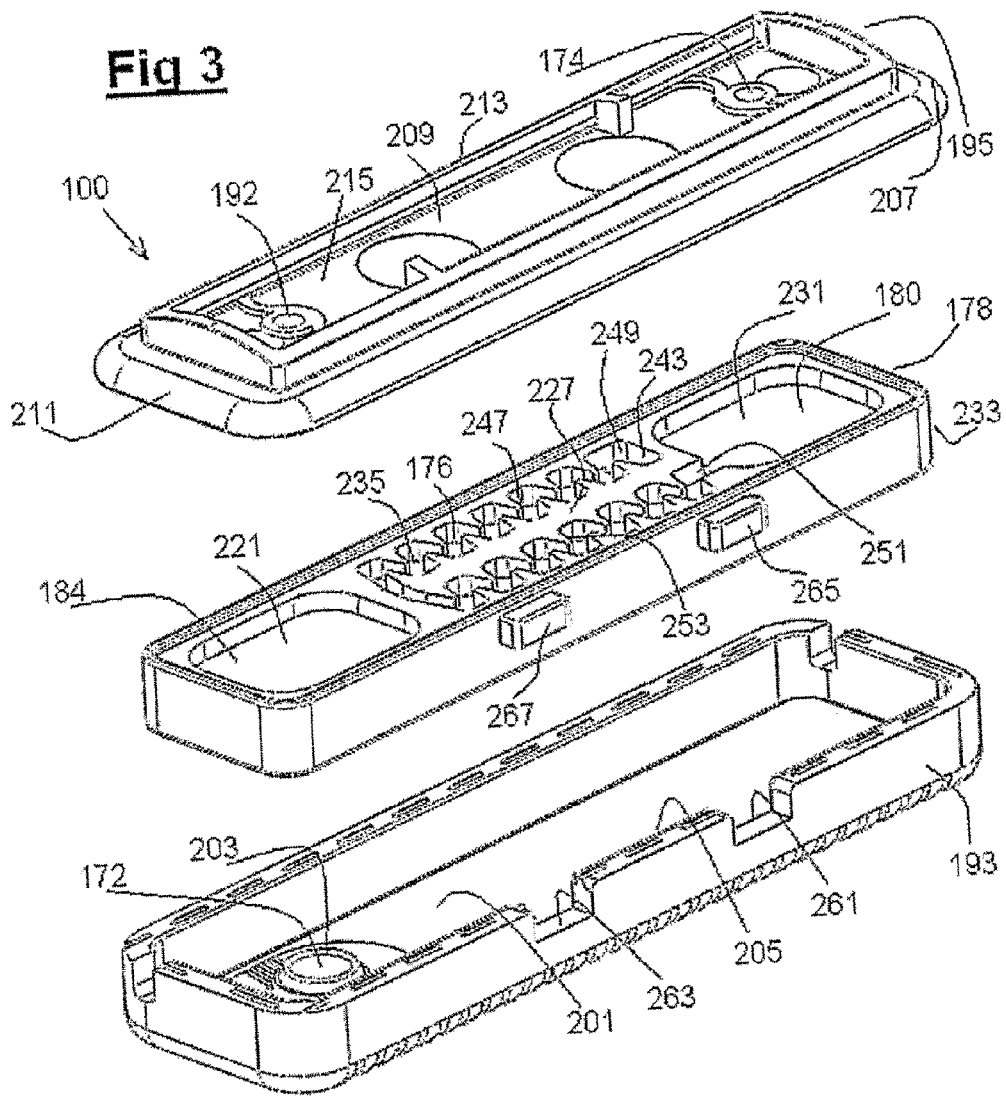

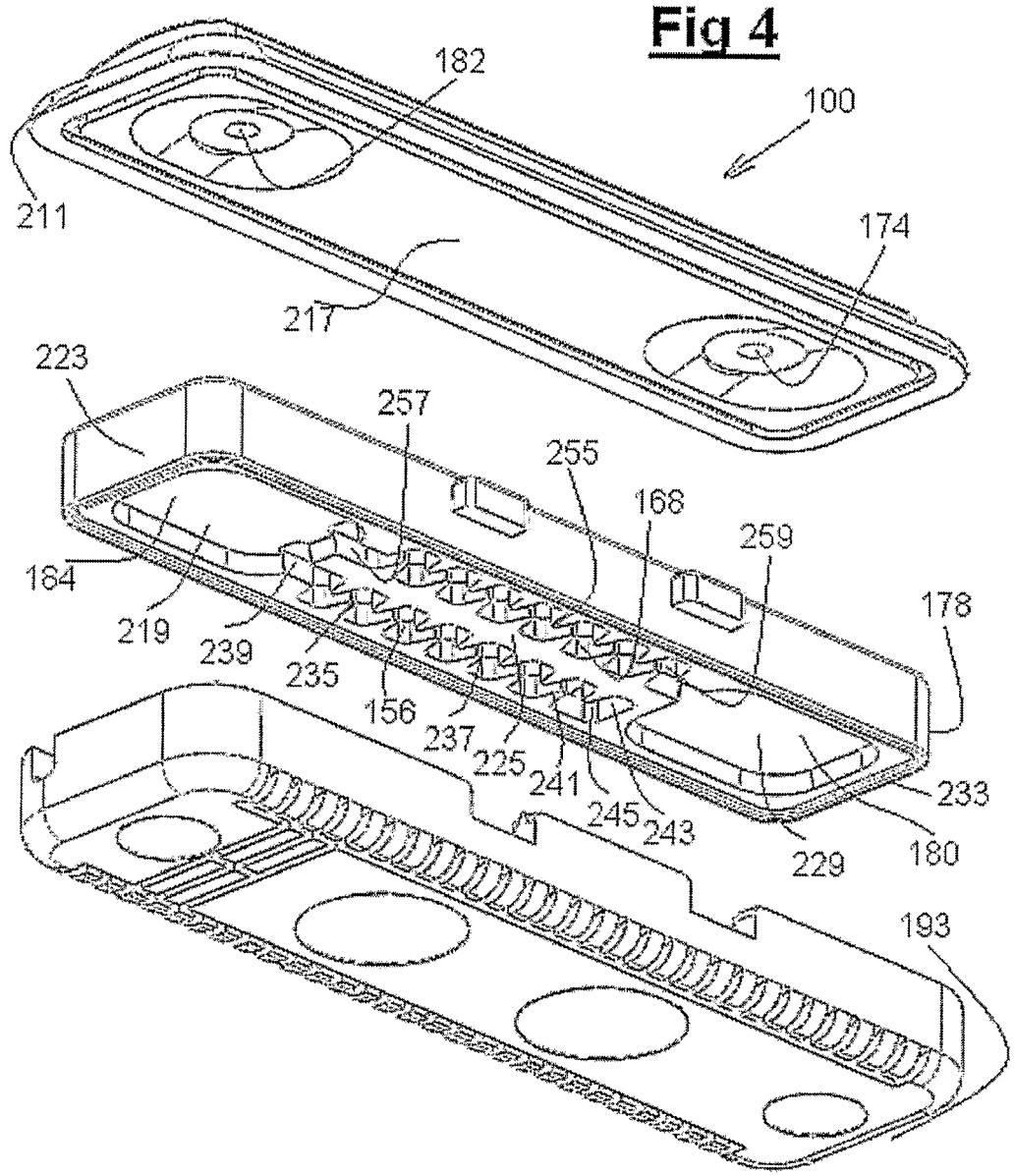

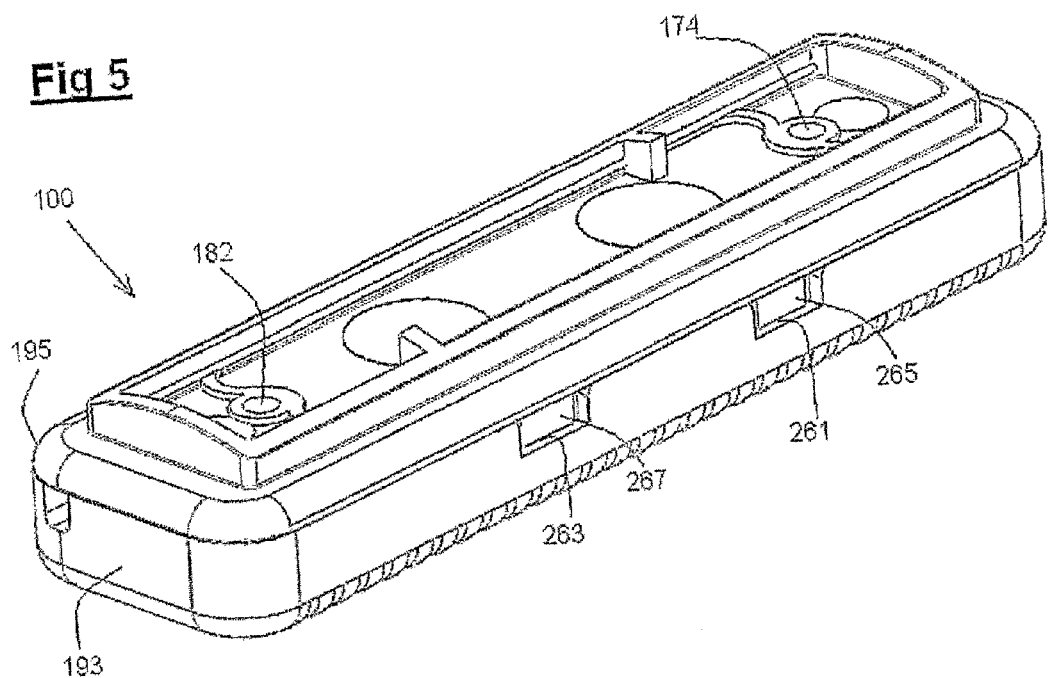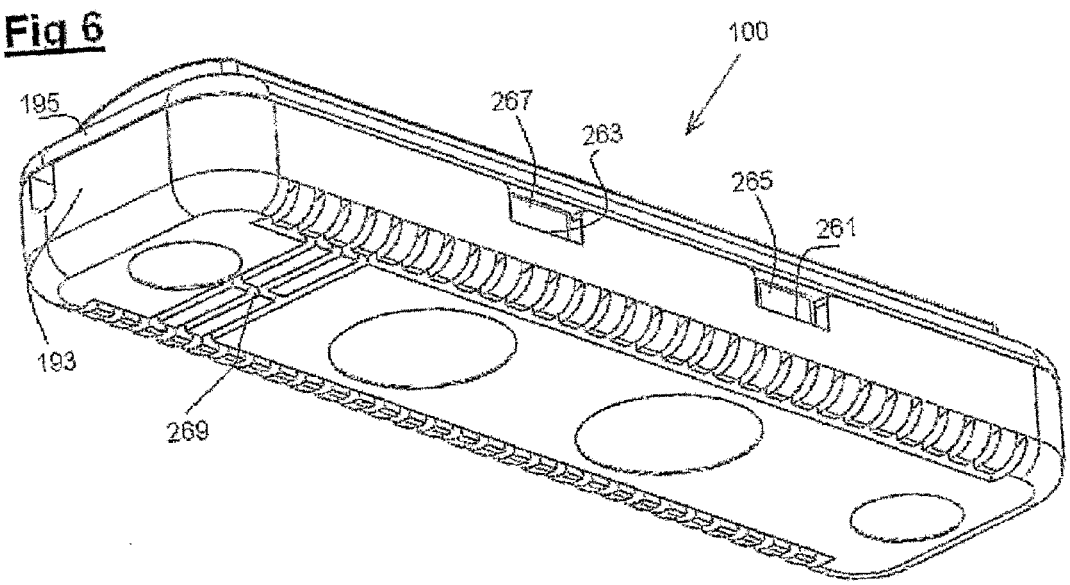

DRIP EMITTER WITH AN INDEPENDENT NON-DRAIN VALVE

RELATED APPLICATION DATA

This application is the U.S. national stage of PCT/IL2006/001207 filed on Oct. 19, 2006, which is based on and claims the benefit of Israeli Application No. 171482 filed on Oct. 19, 2005, the content of each of which is expressly incorporated herein in its entirety by reference hereto.

FIELD OF THE INVENTION

The invention, subject matter of this application, relates to the field of drip emitters that incorporate a regulating mechanism and a non-drip valve.

BACKGROUND OF THE INVENTION

Preliminary Remark—the invention presented herein after would be described in terms of applications referring to agricultural irrigation with water. However, any professional in this field would understand that the invention is not restricted solely to this field, but rather the invention is also applicable to drip emitters that are employed in other fields, such as, for example—wetting and flushing (rinsing) minerals with water or using various different liquids that are not water (for example detergents, or water containing fertilizing materials).

As is well known and recognized from earlier times, there exist drip emitters that are used in agricultural irrigation systems that incorporate in them a mechanism for regulating their throughput quantities (flow rate). The water pressure arriving at the drip emitters is not constant, but rather varies in accordance with the pressure variations in the deployed water supply conduit unto which they are connected. Such variations in water pressure occur, for example, due to pressure variations in the source supplying the water to the conduit, the relative locations of the drip emitters or the varying topography of the landscape upon which the irrigation system is deployed (e.g. mountains, slopes, hills, valleys and similar variables). A regulating mechanism based on an elastomer component enables to increase or decrease the water flow to the output (exit) opening from the drip emitter, exploiting the movements of the elastomer component in accordance with the water pressure prevailing in the conduit. The differential regulation principle might be implemented in these drip emitters, wherein the elastomer component is exposed—on its one side, to the water pressure prevailing in the conduit and on its other side to the reduced pressure of the water, as it flows inside the drip emitter towards the water outlet opening (for example—the reduced water pressure after the water exited from a throttle means of the kind resembling a labyrinth like flow passage installed in the drip emitter). Thus, by integrating a regulating mechanism into the drip emitter, it becomes possible to maintain an essentially constant flow rate through the drip emitter, of the kind best suited for optimal irrigation conditions, independently from variations in the water pressure that, as said, occur in the water supply conduit.

Drip emitters that incorporate in their structure a regulating mechanism that is based on an elastomer component together with a throttle means, are installed in agricultural irrigation systems in a variety of modes—inside the water supply conduit and as an integral part thereof, or as discrete units located between sectors of the conduit along its length, or just as separate units that are stuck into—or connected to—the conduit from the outside.

Irrigation systems utilizing drip emitters pose an additional challenge. This is having the capability to prevent water run off and emptying of the water supply conduit at the time the irrigating action stops and until the next irrigation cycle (a property that would prevent loss of water and the need to build up anew, from the beginning, the required pressure in the conduit when renewing the irrigation). It also contributes to prevent sucking contaminations into the drip emitter and the water supply conduit when the pressure drops in the conduit.

Also well known and recognized from earlier implementations, are those regulated drip emitters in which the elastic properties of the elastomer component (or in other words, the membrane) used in them in the regulating mechanism, are also implemented for creating tight sealing at the water inlet (entrance) opening, and this from the instant that the water pressure in the water supply conduit drops to below a pre set threshold level, or—in other words, exploiting the regulating mechanism's membrane also for generating a non-drain valve. Such an implementation for a drip emitter is described for example in Mehudar's patent U.S. Pat. No. 5,279,462 that describes a regulated drip emitter of the type being stuck and connected to the water supply conduit from the outside, wherein it also includes a non-drain valve.

Referring to FIG. 1a. This figure constitutes a general schematic view of a drip emitter 10 in accordance with the above cited prior art. Drip emitter 10 includes a water inlet opening 11 that is connectable unto a water flow passage to the drip emitter from the water supply conduit (that is not illustrated), a water outlet opening 13 that is connectable to a water flow passage from the drip emitter towards the surface area intended to be irrigated, and a throttle means 15 for reducing the water pressure, the latter is connected to a water flow passage from the water inlet opening 11 and—after the water pressure is reduced, to the water outlet 13, and an elastomer component 17 that constitutes the regulating membrane 19 whose one side is exposed to the water pressure prevailing in the water supply conduit and whose other side (of the membrane) is exposed to the pressure prevailing at the water outlet—so that regulating membrane 19 is movable in accordance with the differential water pressure prevailing on the two sides of the membrane in order to narrow or widen the dimensions of water flow passage 21 towards water outlet 13.

A constructional characteristic of drip emitter 10 is the utilization of the same component—namely the elastomer component 17, also for producing the non-drain valve 23. This is achieved by biasing regulating membrane 19 towards inlet opening 11, from the instant that the water pressure in the conduit drops below a pre set threshold value. Removing the sealing from the non-drain valve 23 and enabling flow passage stream through it is dependent on the capability of the force exerted by the water pressure prevailing in the water supply conduit to overcome at first the strain by which membrane 19 was biased towards water inlet 11, and eventually—in order to maintain the non-drain valve at its open state, it depends also on the force exerted by the reduced pressure of the water over the other side of the same membrane itself after it passes through throttle means 15.

It was found that a distinguished advantage of the implementation of the differential regulating principle in drip emitters, well known from days yore, unluckily contradicts with the assimilation of the non-drain valve mechanism in those same drip emitters, and this especially when it is desired to have the same elastomer component itself serve also for executing the regulating action, namely to act both for creating the regulating action and providing the sealing of the non-drain valve.

The differential regulating principle imparts an advantage as it provides self rinsing or flushing of contaminants from the drip emitter. This applies to those contaminants that "succeeded" in passing through the filter routinely installed at the inlet opening of the drip emitter, and wherein these contaminants were also smaller than the dimensions of the minimal flow path that is formed in the drip emitter's throttle means. Such contaminants are swept and raked towards the water outlet opening of the drip emitter. The drip emitter's regulating mechanism is built so that at the time it is operating, the size of the flow passage that remains open towards the water outlet opening is of the order of magnitude of hundredths of a mm. Since these contaminants are larger than this narrow passage, a clog is formed. But this clog immediately causes an increase of the water pressure in the area in the vicinity preceding the clog location. Due to the water pressure prevailing in the water inlet, which is relatively higher compared to the reduced water pressure after the water passed through the throttle means, the membrane is regularly stressed and driven to reduce the dimensions of the water flow passage towards the water outlet. But, due to the sudden pressure increase upon clogging, the membrane would then tend to retreat a little. This withdrawal of the membrane causes momentarily increases in the dimensions of the flow passage and enables flushing of the contaminants towards the water outlet. Any professional in this field would also understand that such a self flushing phenomena is also occurring at the stage of the gradual build up of the water pressure in the water supply conduit, as well as at the stage of closing the water source and the decrease of the pressure in the conduit (the stage at which the membrane reverts to its "paused" state, while opening the flow passage towards the water outlet of the drip emitter to its maximum size).

Exploiting the self rinsing or flushing phenomena as explained above, requires—naturally, advanced and accurate designing of the membrane—from the point of view of both structural and geometrical aspects. In order to enable such a self rinsing phenomena, the membrane has to retreat at least back to the point of providing a minimal flow passage equal to the one that is formed in the throttle means of the drip emitter (as obviously the contaminants that passed the throttle means might be of the same size). Concurrently, as a design principle, it is customary to try and increase the size of the minimal flow passage formed in the drip emitter's throttle means as much as practicable (in order to prevent generating the clog already inside the throttle means), and obviously such a design goal leads to necessitating a larger retreat step of the membrane (at least during the gradual build up stage of the water pressure in the conduit and also in the stage of shutting down the water source with the ensuing result of pressure drop in the conduit).

Supposing that in accordance with the prior art detailed above it would be desired that the same elastomer membrane component would serve for both performing the regulating action and as a seal in the non-drain valve, then—in order to obtain the biasing of the membrane against the water inlet of the drip emitter (as required for obtaining sealing and prevention of water run of), it is necessary to pre-load and strain the membrane with a substantially marked strain. Such a strain, by itself, limits the remaining dynamic range that would be left for later movements of the membrane (as required for the regulating action and for its retreat if a clog is created).

It is obviously clear that if it is desired that the non-drain valve should close down and seal the flow passage through it at relatively high pressure values that prevail in the water supply conduit line, then it is required to strain the membrane with a larger "biased" (preset) stress. This pre-loading strain would eventually limit the dimensions of the water flow passage into the drip emitter on opening of the non-drain valve, and simultaneously constrain the dimensions of the water flow passage towards the water outlet from the drip emitter (a passage that is required, as said, to have an as large as practicable size in order to gain an effective self flushing action).

Thus, exploiting the same membrane to accomplish two goals—to perform the regulation operation and to serve as a seal of the non-drain valve, was found to be associated with considerable difficulties that might even harm the unmistakably clear advantages of the differential regulation principle and impart constraints on advanced design of the throttle means in drip emitters. As a consequence, the utilization of the same membrane for the two functions as suggested,—i.e. regulation and seal in the non-drain valve, does not provide an answer to the requirements of the agriculture community, that the non-drain valve would enable closing the drip emitter and prevent drainage through it, even at relatively high pressure values that prevail in the water supply conduit—three to seven (3-7) meter. According to the best available knowledge of the applicant, regulated drip emitters equipped with a non-drain valve, of the type that is installed within the water supply conduit and as an integral part thereof, enable nowadays closing of the non-drain valve solely for a relatively low pressure of about one to three (1-3) meter.

Eckstein's patent U.S. Pat. No. 5,615,838 described a regulated drip emitter of the type that is affixed to the inner wall of the water supply conduit (inserted during the manufacturing process of the conduit, for example—by extrusion,) and includes a non-drain valve. In the configuration illustrated in the patent (see there, FIG. 1 and FIG. 3), the regulating function is carried out by resorting to increasing or decreasing the affective length of the throttle means. The elastomer component in there serves for increasing or decreasing the effective length of the throttle means by using several valves that are located along the throttle means. A rise of the water pressure within the water supply conduit stresses the elastomer component to a gradual progressing closing of the valves array and as a consequence of this, to direct the water flow to pass through a longer throttle means.

Figure 1B:
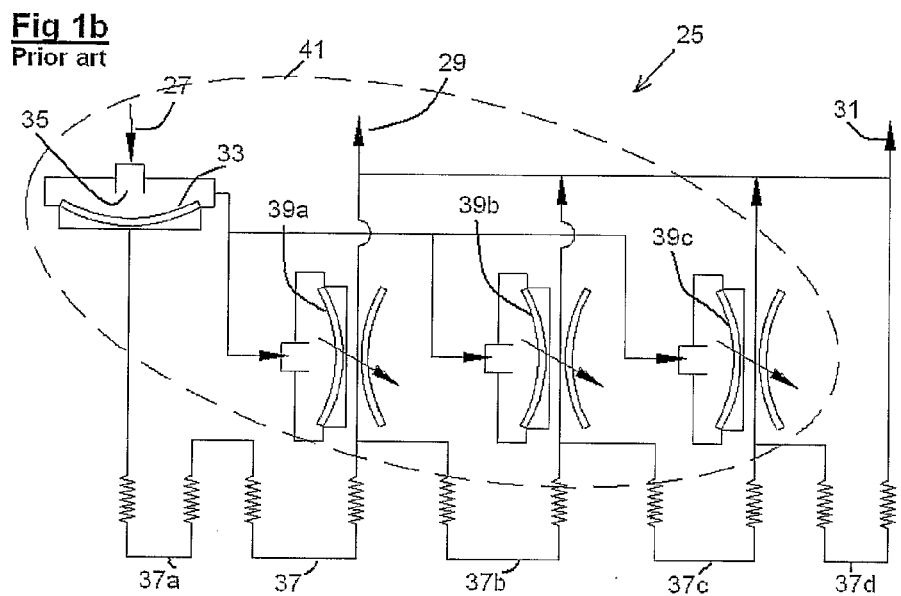

Referring to FIG. 1b. This figure constitutes a general schematic view of a drip emitter 25 in accordance with the above cited prior art (and see FIG. 1 in above cited patent). Drip emitter 25 includes a water inlet 27 that is connectable to a water passage from the water supply conduit (that is not illustrated) into the drip emitter. Two water outlet openings 31 and 29 are connected between them, and couple to a flow passage from the drip emitter towards the surface area intended to be irrigated. An elastomer portion 33 is strained and biased against the water inlet opening 27 for creating non-drain valve 35. Throttle means 37 is provided in order to reduce the water pressure. The latter is formed as a plurality of throttle means sectors 37a to 37d that are inter connected one to the other in series. Upon opening non-drain valve 35, throttle means 37 is connected to a flow passage into it from water inlet 27 and to the water exit from it, after the water pressure is reduced, toward water outlets openings 29 and 31. Elastomer portions 39a to 39c constitute regulating membranes that upon opening of the non-drain valve 35, their one side is exposed to the water pressure prevailing in the water supply conduit and their other side is exposed to the various water pressure values that prevail at different points along throttle means 37, so that regulating membranes 39a to 39c have become moveable in order to increase or decrease the effective length of throttle means 37. In other words, the rise of the water pressure in the water supply conduit stresses elastomer portions 39a to 39c to affect a gradual progressive closing of the valves and as a consequence of this, to route the water flow so that the water passage through throttle means 37 is longer. A constructional characteristic of drip emitter 25 is the utilization of a single elastomer component—namely component 41, so that different portions of it are designated for serving as seal 33 of the non-drain valve and for the needs of the regulating membranes 39a to 39c.

The ensuing drawback is that drip emitter as per this prior art is prone to malfunctions because a relatively narrow flow passage is formed in the non-drain valve. A narrow flow passage that may be suffices for passing the required throughput but might lead to the danger of accumulating contaminants already at the non-drain valve location. From the instant that non-drain valve 35 is opened, the water pressure that prevails on the two sides of elastomer portion 33 would be substantially similar and in this state, a relatively narrow water inlet passage would result, and as much as one desires to use the mechanism described there, at high opening-closing pressures, so would the passage become narrower and an unwanted phenomena of choking the elastomer portion at a high rate towards water inlet opening 27 will occur. In other words, in the configuration described in the cited Eckstein's patent, removing the seal from non-drain valve 35 and allowing flow passage through it at its open state, depends on the capability of the force that is exerted by the water pressure prevailing at the water supply conduit to overcome, first, the strain at which membrane 33 was biased towards water inlet 27, and then (later, in order to continue and leave the valve at the open state), also on the force that the water pressure exerts after the water passed the non-drain valve on the other (second) side of the same membrane 33 itself.

Moreover, a selection—if it would be made, by a professional in this field of the preferred embodiment described in the above cited patent (see there, FIG. 3), poses the professional vis a vis a dilemma (problem) similar to the one described above when referring to Mehoudar's patent U.S. Pat. No. 5,279,462, namely, whether to focus on optimal design of a given membrane as the regulating membrane, or may be to focus on its design to suit it properties as the seal of the non-drain valve. In the configuration described in Eckstein's patent with reference to FIG. 3 there, one of the portions of the elastomer component that serves also as one of the regulating membranes, doubles as being also the seal of the non-drain valve (see there, component marked 68). Any professional in this field would understand that any one of the regulating membranes of drip emitter as per Eckstein's patent might perform the gradual closing and opening of a flow passage. It is required to perform this operation at defined pressures and at a defined rate (relative to the increase of the water pressure prevailing in the water supply conduit or to its decrease). This requirement contradicts the requirement that when functioning as a non-drain valve seal, the same membrane should perform complete opening or closing operation, at a defined pressure that might be relatively high.

Regulated drip emitters that are also of the type that is affixed to the inner wall of the water supply conduit are described in Cohen's patent U.S. Pat. No. 6,302,338. In these drip emitters the functions of the regulation action and that of the non-drain property were separated. This is achieved by using two separate and dedicated elastomer components, one as the regulating membrane and the other as the non-drain seal. In the configuration described in the patent, the regulating function is taken care of by an approach of increasing or decreasing the dimensions of the flow passage that is formed along the throttle means.

Figure 1C:
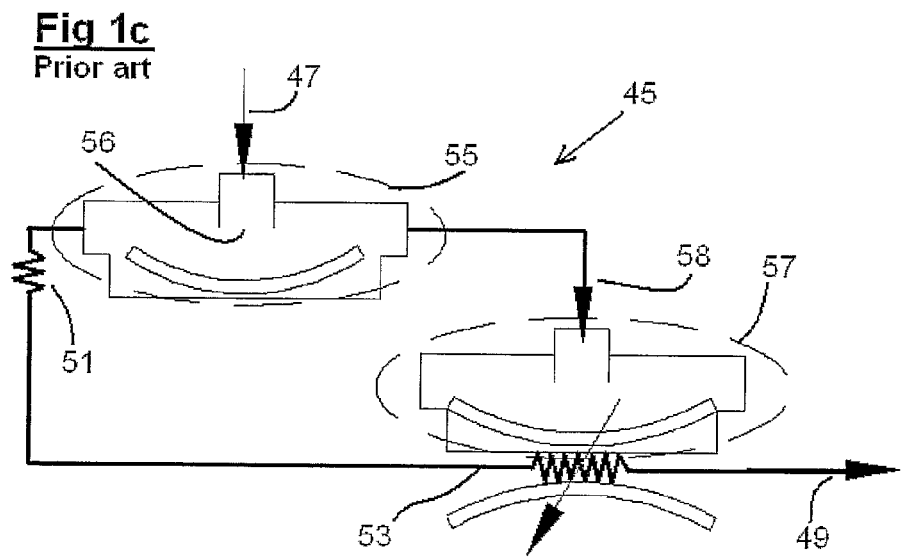

Referring to FIG. 1c. This figure constitutes a general schematic view of a drip emitter 45 in accordance with Cohen's patent. Drip emitter 45 comprises a water inlet opening 47 connectable to a water flow passage to the drip emitter from the water supply conduit (that is not illustrated) and a water outlet 49 that is connectable to a water flow passage towards the surface area intended to be irrigated. Connected in series one to the other in drip emitter 45 are preceding throttle means 51 and a following throttle means 53 intended for lowering the prevailing water pressure. The throttle means are connected to a water flow passage into them from water inlet 47 and to water flowing out from them after the water pressure was reduced, to water outlet opening 49. Also there is a first elastomer component 55 that in order to form a non-drain valve 56 is pre-strained and biased towards water inlet opening 47 (or—in the alternative illustrated there in FIG. 5, to the water outlet opening), from the instant that the water pressure in the water supply conduit drops to below a pre set threshold value. A second elastomer component 57 serves as the regulating membrane—on its one side it is exposed to the water pressure prevailing in the water supply conduit (see arrow numbered 58) and on its second (other) side—to the water pressure that gradually decreases as it passes through throttle means 53, and is moveable in order to reduce or increase the dimensions of the flow passage that is formed in throttle means 53.

The ensuing drawback is that resorting to use two different elastomer components causes an increase of the manufacturing and assembling expenditures of the drip emitters (obviously—as an additional elastomer component is added). Moreover, similarly to what was explained above when referring to Eckstein's patent U.S. Pat. No. 5,615,838, in the present case too, a drip emitter in accordance with this prior art is prone to the formation of a relatively narrow flow passage in the non-drain valve. Such a narrow flow passage that may be suffices for passing the required water quantity throughput but might lead to the danger of accumulating contaminants already at the non-drain valve space. From the instant that non-drain valve 56 is opened, the water pressure that would prevail on the two sides of elastomer component 55 would be approximately similar one to the other and in this state of affairs, a relatively narrow water inlet passage would result, and as much as one desires to use the mechanism described there with high opening-closing pressures, so would the passage become narrower and an unwanted phenomena of the choking elastomer component at a high frequency, towards water inlet opening 47 would occur. In other words, in the configuration described in Cohen's patent, removing the seal from non-drain valve 56 and allowing flow passage through it at its open state, is depends on the capability of the force that is exerted by the water pressure prevailing at the water supply conduit to overcome, first, the strain at which membrane 55 is biased towards water outlet opening 47, and then (later, in order to continue and leave the valve at the open state), also overcome the force that exerted by the pressure of the water that passed through the non-drain valve on the other (second) side of the same membrane 55 itself.

Further more, a selection—if it would be made, by a professional in this field of the preferred embodiment described in Cohen's patent (see there, in FIG. 1b), would even worsen the prevailing condition. Cup 50 that is described in the cited patent as the non-drain valve's seal, due to the specific structure of its configuration (as a cup with a "skirt 52" around its edges—see there), hinders the opening of a large flow passage and increases the choking phenomena at high frequency towards the water inlet opening.

SUMMARY OF THE INVENTION

The present invention constitutes a regulated drip emitter incorporating an independent non-drain valve that enables opening-closing of the valve even when the pressure in the water supply conduit is relatively high, wherein the water flow passage that is opened when the non-drain seal is removed at the planned pressure (that might be, as said, relatively high), is relatively wide in its dimensions and remains relatively wide during all the time that the drip emitter is in operation.

In a drip emitter in accordance with the present invention, removal of the sealing from the non-drain valve and leaving the water flow passage through it in the open state, and this—in all and every stage of the drip emitter operation, is solely dependent upon the capability of the force that is exerted by water pressure prevailing in the water supply conduit to overcome the strain at which the non-drain valve seal was biased against the inlet opening to the drip emitter jointly with overcoming the approximate atmospheric pressure that prevails on its other (second) side.

The invention—the subject matter of this application, when its general aspect is being considered, constitutes a drip emitter that comprises elements that are known in this field and were already operating in the past. Specifically, they include a water inlet opening that is connectable into a flow passage from the water supply conduit to the drip emitter, a water outlet opening connectable to a flow passage from the drip emitter towards the area intended to be drip irrigated, throttle means used to decrease the water pressure and is connectable to a flow passage into it from the water inlet opening and to the exit of the water from it after the water pressure was decreased, towards a water outlet opening, and at least one elastomer component wherein at least one portion of it constitutes a regulating membrane that on its one side is exposed to the water pressure prevailing in the water supply conduit and on its other side is exposed to the reduced pressure of the water, as it flows inside the drip emitter towards the water outlet opening of the drip emitter, so that a portion of the regulating membrane is moveable in accordance with the differential water pressure that prevails on both sides of this portion.

From the constructional aspect, a drip emitter in accordance with the invention, the subject matter of the application, is characterized by that it is formed with an additional opening that is exposed to the approximate atmospheric pressure that prevails at the water outlet opening from the drip emitter. An elastomer component in drip emitter in accordance with the invention is formed with a membrane portion that its one side is pre-strained and biased against the water inlet opening for closing it and on its other side it is directly coupled to the additional opening. The membrane portion is moveable towards the additional opening for opening the water inlet opening to enable flow passage from the water supply conduit to the drip emitter, and this—from the instant that the force that is exerted by the water pressure prevailing in the water supply conduit, on the one side of the membrane portion, overcomes (first) the strain by which the membrane portion was stressed towards the water inlet opening and on the approximate atmospheric pressure that prevails on the other side of the portion.

In other words, in a drip emitter in accordance with the present invention, the non-drain valve function is executed independently and separately from the regulating function. At any given time during the operation of the drip emitter (closing the non-drain valve, opening the non-drain valve, reducing the water pressure as it passes through the drip emitter towards the water outlet opening from the drip emitter, regulating the water passage in the drip emitter), the membrane portion that serves in the drip emitter as the non-drain valve seal, is exposed on its one side to the water pressure prevailing in the water supply conduit and on its other side is exposed to the approximate atmospheric pressure that prevails at the water outlet opening from the drip emitter. That is to say that in drip emitters in accordance with the invention, at any one stage, the membrane portion that serves in the drip emitter as a seal of the non-drain valve is exposed to the maximum differential pressure that prevails in the irrigation system.

A drip emitter in accordance with a preferred embodiments of the invention enables the manufacturing and assembly of the unit with ease—as it is inherently simple, coupled with relatively low cost, as a consequence of the small number of components it is made of. In the preferred embodiments of the invention, the drip emitters comprises only one elastomer component—of which one portion is dedicated to serve as the seal of the non-drain valve and one more portion is implemented as the regulating membrane.

A drip emitter in accordance with another and additional preferred embodiment of the invention adopts and keeps the inherent advantages of the differential regulation principle (i.e., self rinsing or flushing) and enables forming its throttle means with relatively large flow passages, thus reducing the number of clogging phenomena occurrences.

In yet another and additional aspect of the invention, the subject matter of this application, the invention embodies in it a general method of separating the regulating function from the non-drain sealing function in drip emitters in which a regulating mechanism is implemented. This method is characterized by this that during the course of all the stages that characterize the operation of a regulated drip emitter equipped with a non-drain valve, namely—the stages of closing the non-drain valve; opening the non-drain valve; decreasing the water pressure as the water passes through the drip emitter towards the water outlet opening from the drip emitter and finally the regulating stage, the portion of the elastomer component in a drip emitter that is in accordance with the invention that serves as the sealing of the drip emitter's non-drain valve, is exposed on its one side to the water pressure prevailing in the water supply conduit and—on its other side, only to the approximate atmospheric pressure that prevails at the water outlet opening from the drip emitter.

In a preferred embodiment of the method, the method includes a preliminary stage of allocating a first portion of the elastomer component in the drip emitter to be used as a sealing of the non-drain valve and a second portion of the same elastomer component itself—to be used as the membrane of the regulating mechanism of the drip emitter.

In another and additional preferred embodiment of the method, it includes a stage of directing the water flow from the water inlet opening to the drip emitter, from the instant that the sealing of the non-drain valve was removed, concurrently, both to the throttle means and away from it, after it served to decrease the water pressure, towards the water outlet opening of the drip emitter, and to a one side of at least one portion in the elastomer component of the drip emitter that serves as the membrane of a regulating mechanism, so that this portion becomes moveable in accordance with the differential water pressure that prevails on its two sides.

The present invention is amenable to be implemented in all the variety of regulated drip emitters—in drip emitters (flat or round) that are affixed unto the inner wall of the water supply conduit, in drip emitters that are deployed along the length of the water supply conduit between sectors of the conduit and in drip emitters that are stuck into the water supply conduit or coupled to it from the outside.

The present invention is also given to be implemented by integrating it with all known types of regulated drip emitters—decreasing or increasing the dimensions of the flow passage towards the water outlet opening, decreasing or increasing the effective operating length of the throttle means and decreasing or increasing of the dimensions of the flow passage formed along the throttle means (whether by movement of the regulating membrane towards the flow passage formed along the length of the throttle means and from it, or by movement of throttle means formed in the moveable regulating membrane towards the flow passage and away from it).

BRIEF DESCRIPTION OF THE ACCOMPANYING FIGURES

The present invention will be described herein under in conjunction with the accompanying Figures. Identical components, wherein some of them are presented in the same Figure—or in case that a same component appears in several Figures, will carry an identical number.

FIGS. 1a to 1c constitute as said, schematic illustrations of regulated drip emitters with a non-drain valve, in accordance with prior art.

Figure 2A:
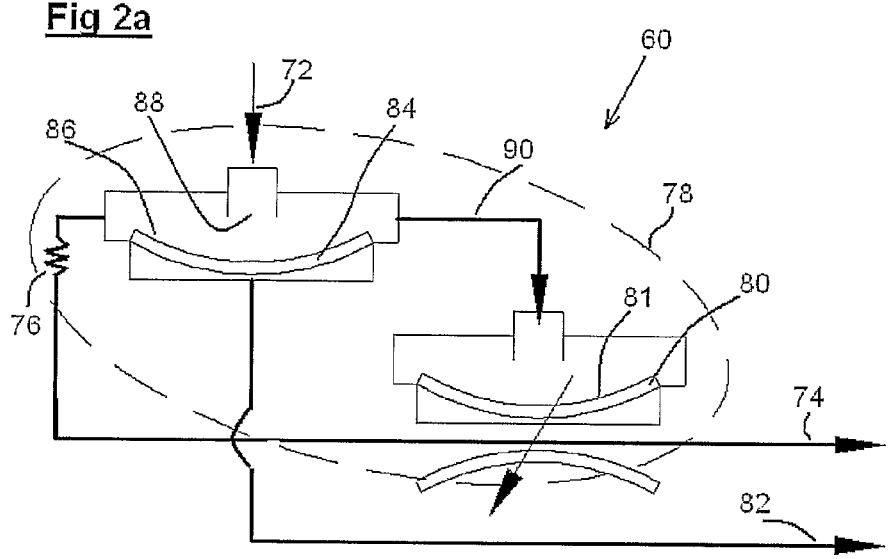
Figure 2B:
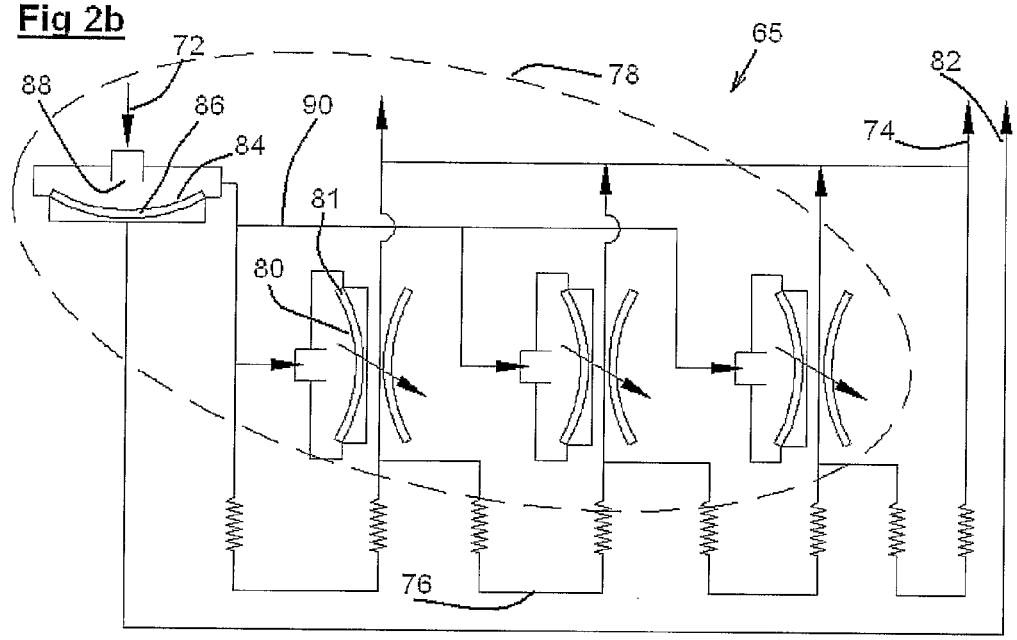

FIGS. 2a to 2c constitute schematic illustrations of examples of regulated drip emitters with an independent non-drain valve, in accordance with the present invention.

FIG. 3 constitutes an exploded view of one example of drip emitter in accordance with the present invention.

FIG. 4 constitutes an exploded view taken at a different angle, of the same drip emitter whose components were illustrated in FIG. 3.

FIG. 5 constitutes a view in perspective of the drip emitter whose components were illustrated in FIGS. 3 and 4.

FIG. 6 constitutes a view in perspective from another angle of the drip emitter illustrated in FIG. 5.

Figure 7:
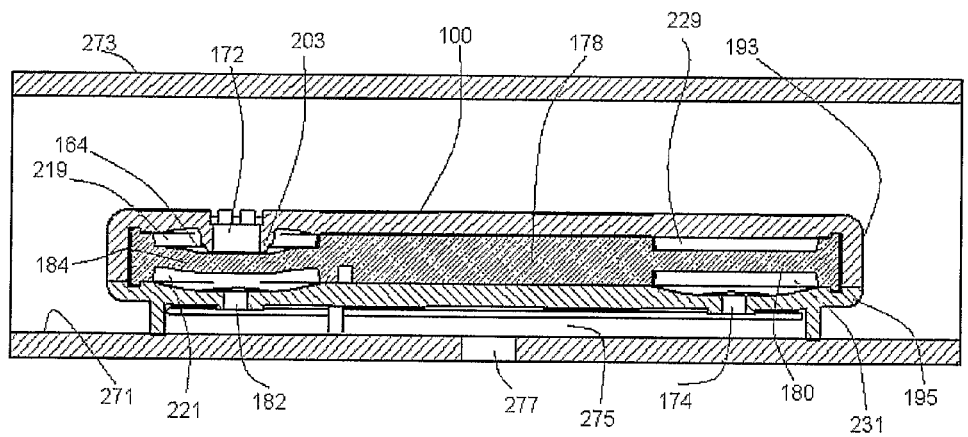

FIG. 7 presents a lengthwise cross section view of the drip emitter illustrated in FIG. 6, wherein the drip emitter is affixed unto an inner wall of the water supply conduit and is found in its "paused" state—the non-drain valve is closed.

Figure 8:
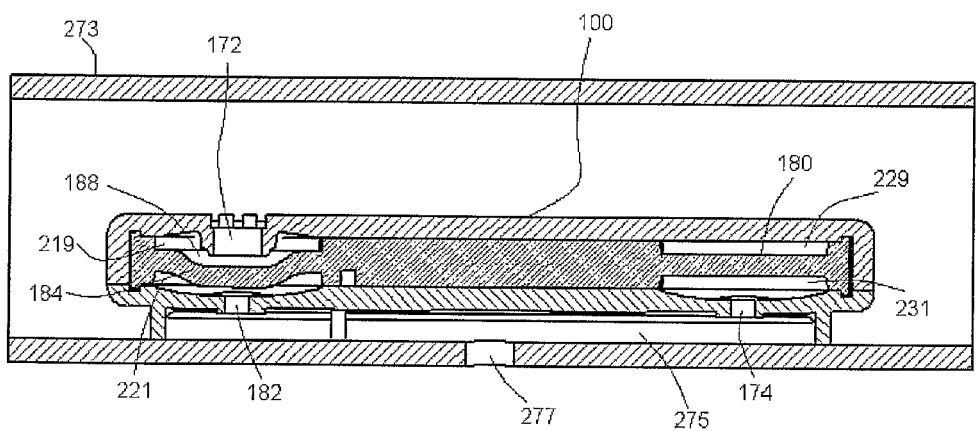

FIG. 8 constitutes a lengthwise cross section view of the drip emitter illustrated in FIG. 7, wherein the drip emitter is found at the open position of the non-drain valve—upon the rise of the water pressure in the water supply conduit.

Figure 9:
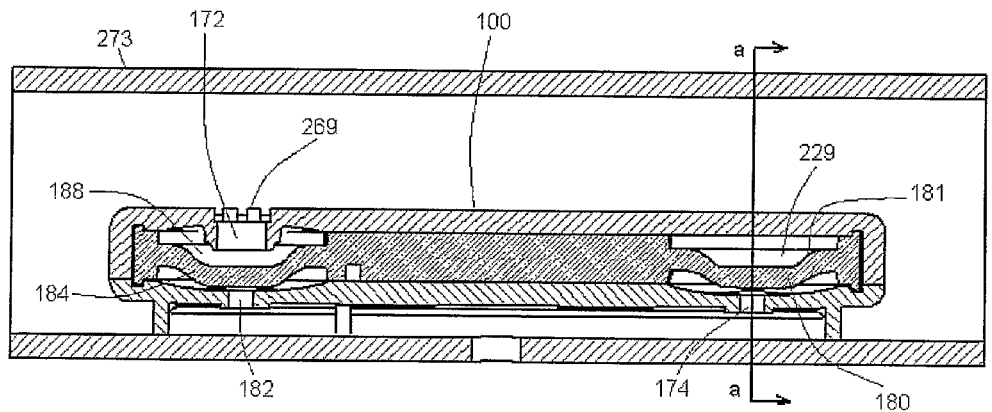

FIG. 9 constitutes a lengthwise cross section view of the drip emitter illustrated in FIG. 8, wherein the drip emitter is found at its regulating state—the non-drain valve is in its open state and the regulating membrane portion stretched towards the water outlet opening and decreases the dimensions of the water passage flow toward it.

Figure 10:
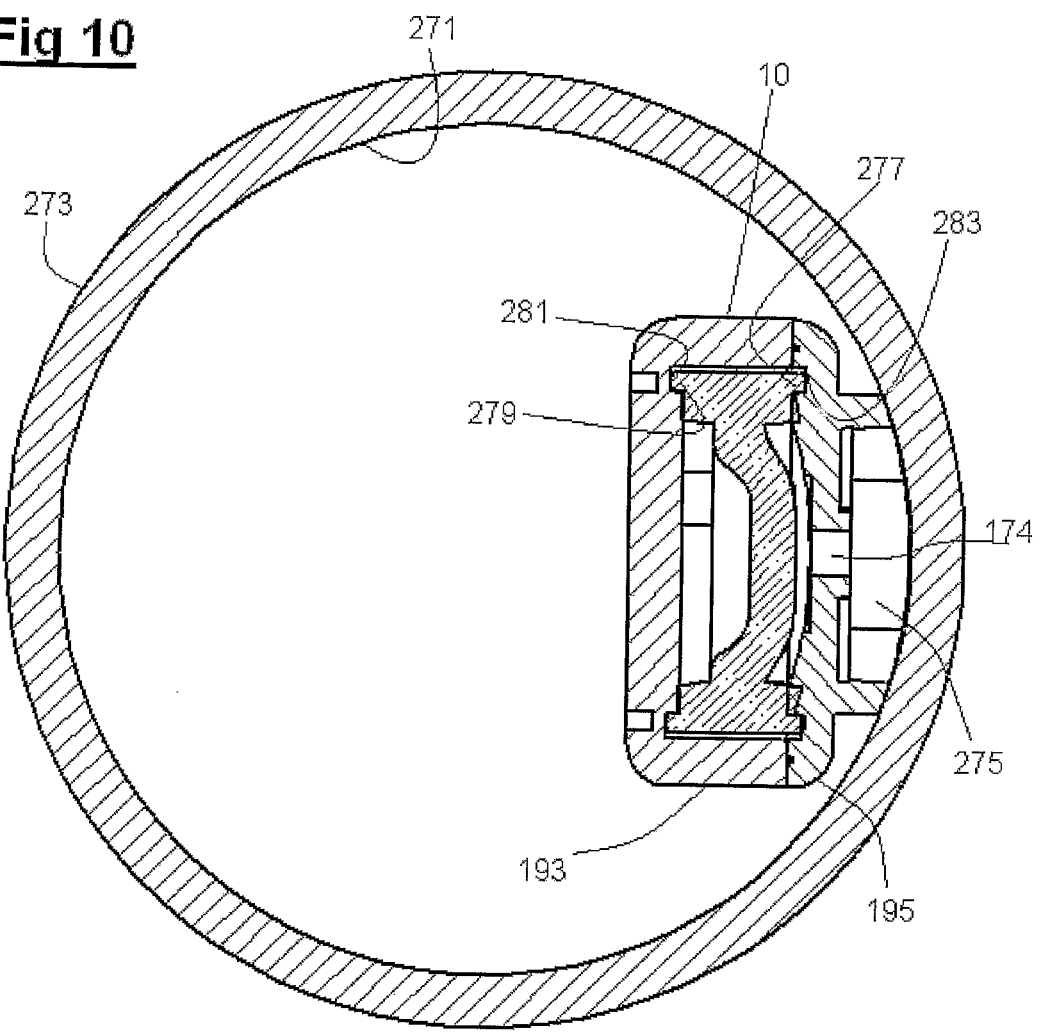

FIG. 10 constitutes a width cross-section view of the drip emitter illustrated in FIG. 9 (cross section a-a as marked there).

Figure 11:
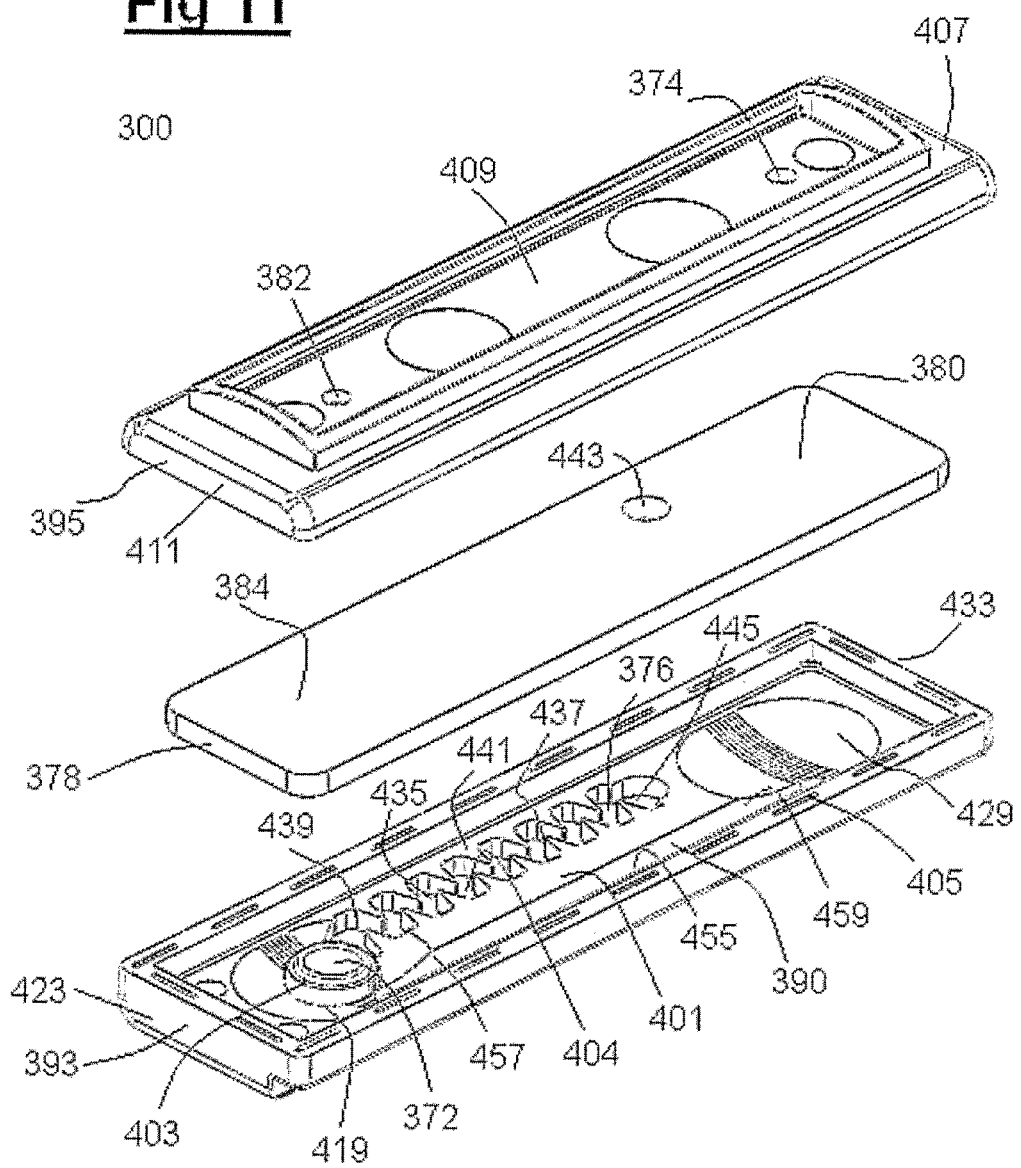

FIG. 11 constitutes an exploded view of another example of a drip emitter's components in accordance with the present invention.

Figure 12:
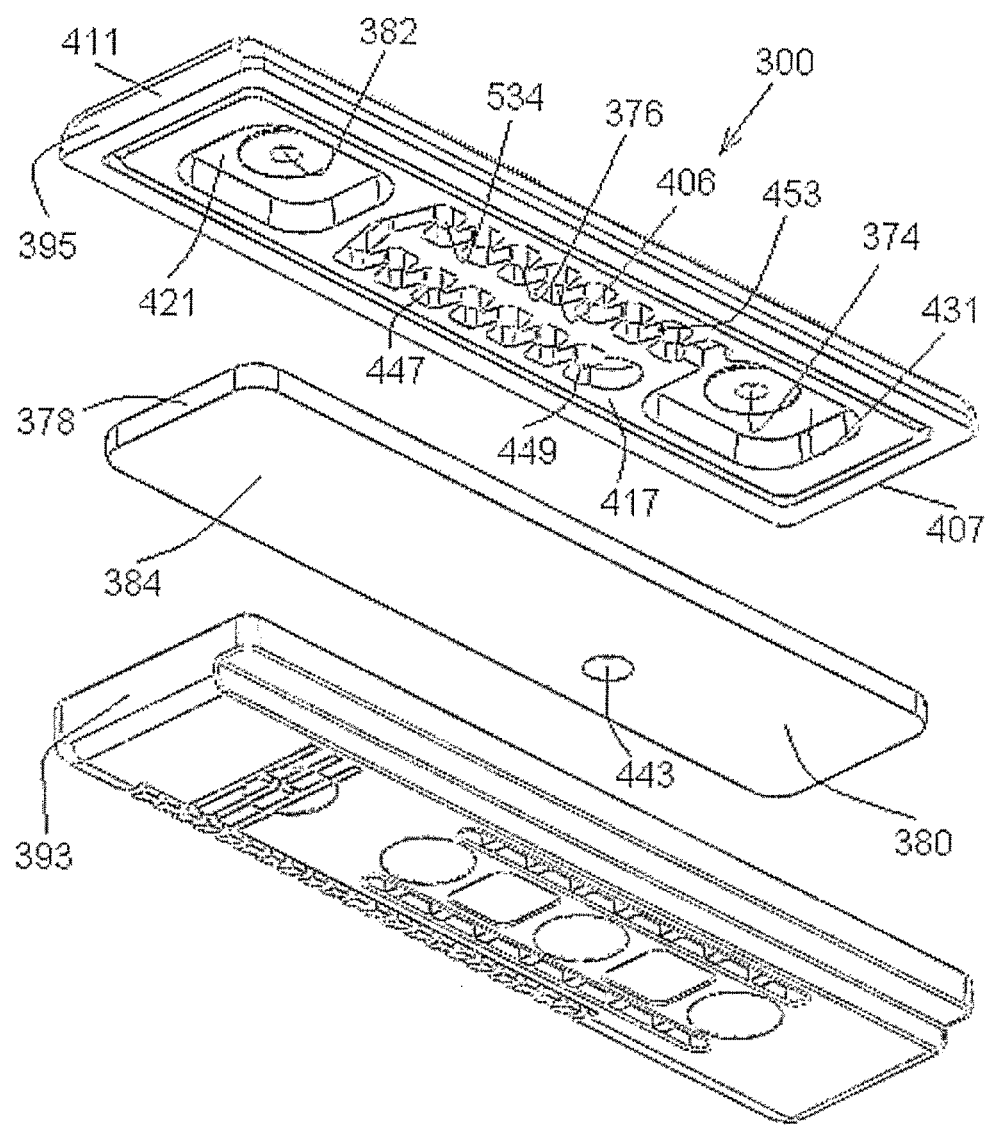

FIG. 12 constitutes an exploded view from a different angle of the components of the same drip emitter whose components were illustrated in FIG. 11.

Figure 13:
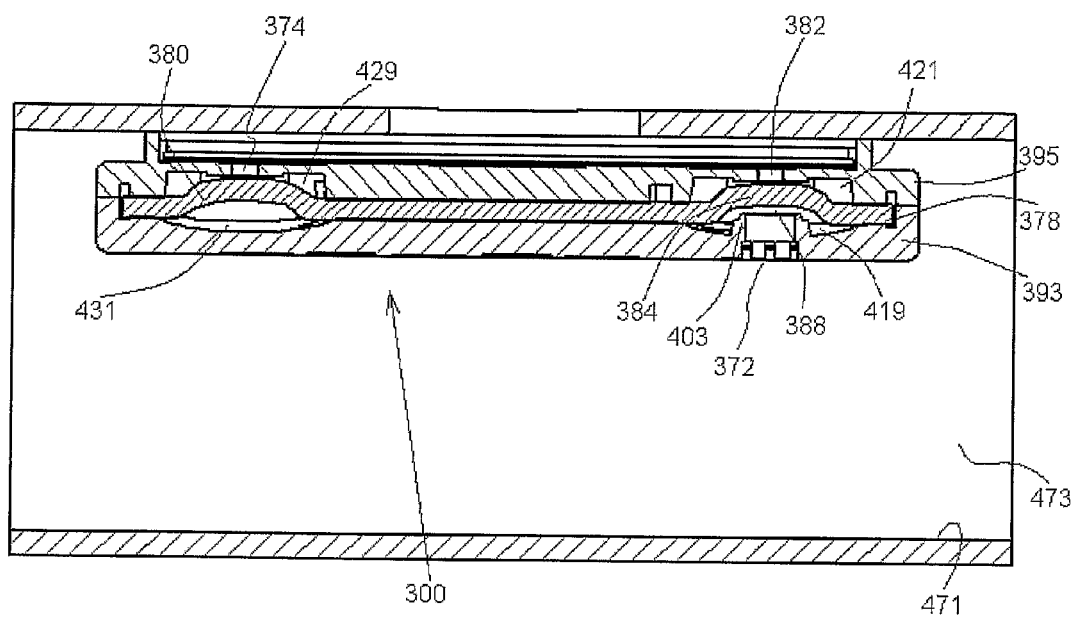

FIG. 13 constitutes a cross section view of the drip emitter whose components were illustrated in FIGS. 11 and 12, wherein the drip emitter is affixed unto an inner wall of the water supply conduit and is found at its regulating state—the non-drain valve is in its open state and the regulating membrane portion stretched towards the water outlet opening and decreases the dimensions of the water flow passage into it.

Figure 14:
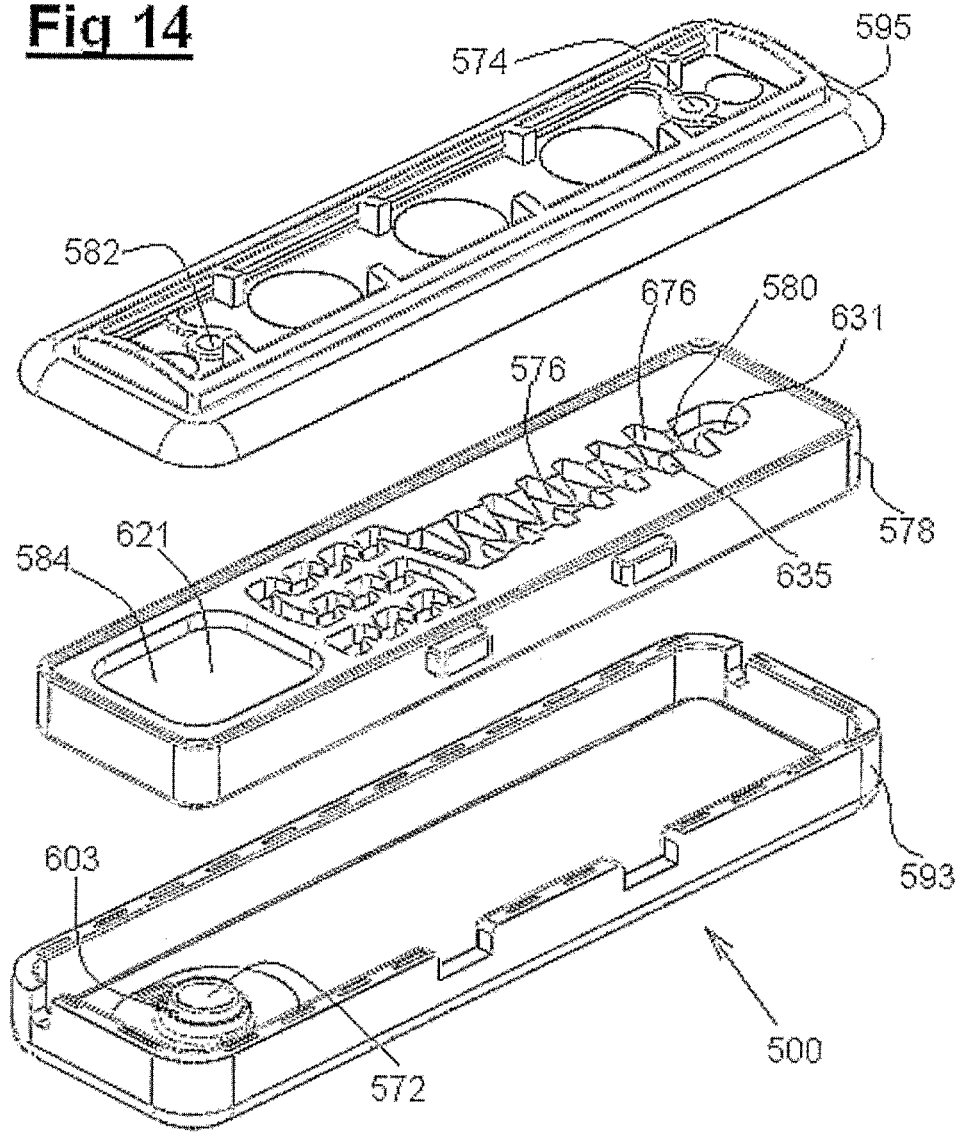

FIG. 14 constitutes an exploded view of the components of another example of a drip emitter in accordance with the present invention.

Figure 15:
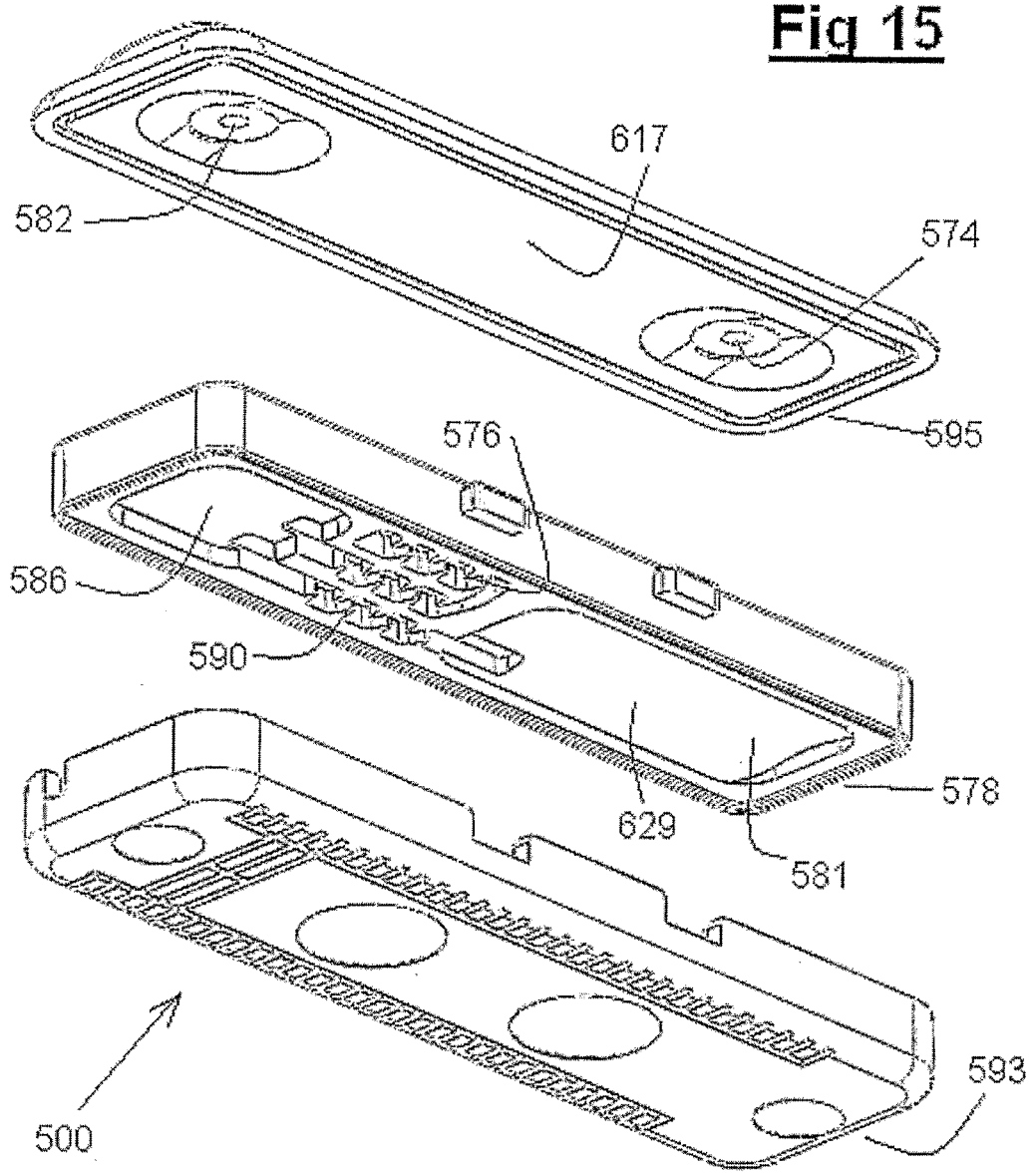

FIG. 15 constitutes an exploded view from another angle of the components of the same drip emitter whose components were illustrated in FIG. 14.

Figure 16:
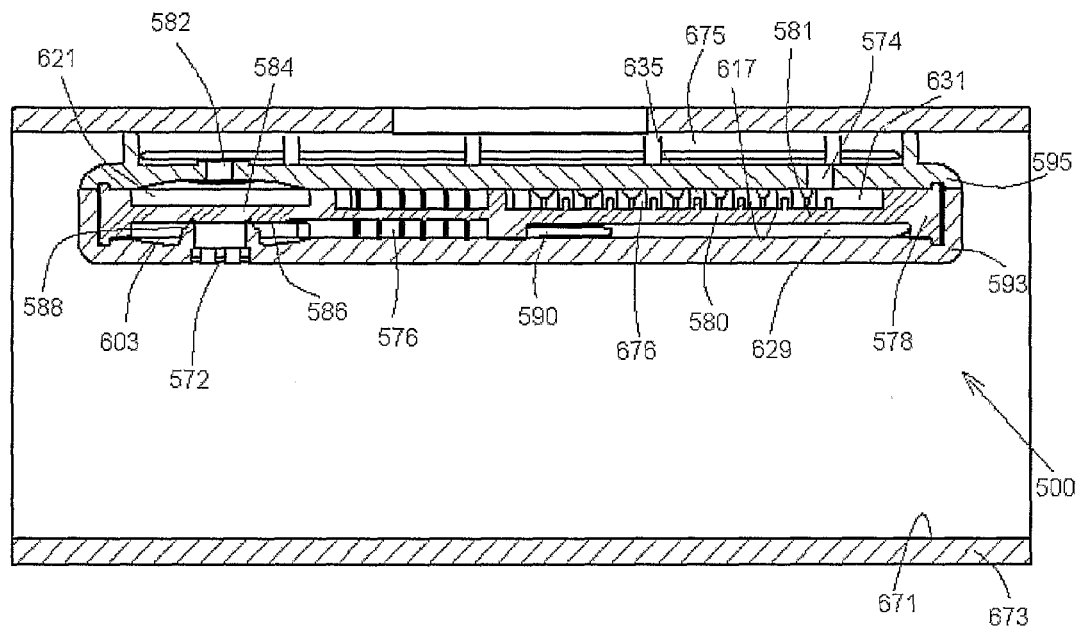

FIG. 16 constitutes a lengthwise cross section view of the drip emitter whose components were illustrated in FIGS. 14 and 15, wherein the drip emitter is affixed unto an inner wall of the water supply conduit and is found in its "paused" state—the non-drain valve is closed.

DETAILED DESCRIPTION OF PREFERRED EMBODIMENTS OF THE INVENTION

Referring to FIGS. 2a to 2c. These figures constitute schematic illustrations of examples of regulated drip emitters with an independent non-drain valve, in accordance with the present invention. Any professional in this field would be able to evaluate the constructional characteristic of the present invention, the method of its operation and the important differences between it and the prior art from comparing these figures to the schematic illustrations of examples of regulated drip emitters equipped with non-drain valves in accordance with the prior art, as this prior art was explained above, in the "Background of the Invention" chapter, while referring to FIGS. 1a to 1c.

A schematic view of a drip emitter 60 is presented in FIG. 2a. Drip emitter 60 is of the kind in which a regulating mechanism is implemented, one that increases or decreases the dimensions of the flow passage of the water, after the water passed and emerged from the throttle means, towards the water outlet opening from the drip emitter (see and compare with the prior art FIG. 1a).

A schematic view of a drip emitter 65 is presented in FIG. 2b. Drip emitter 65 is of the kind in which a regulating mechanism is implemented, one that increases or decreases the effective length of the throttle means by using several valves that are located along the throttle means (see and compare with the prior art FIG. 1b).

A schematic view of a drip emitter 70 is presented in FIG. 2c. Drip emitter 70 is of the kind in which a regulating mechanism is implemented, one that increases or decreases the dimensions of the flow passage formed in the throttle means of the drip emitter (see and compare with the prior art FIG. 1c).

The invention, the subject matter of this application, as per its general aspect, is a drip emitter that comprises constructional elements that are known and recognized as prior knowledge in this field (elements that those resembling them are given, hence, a different number, also when relating to the schematic representations of drip emitters of prior art, see FIGS. 1a to 1c).

In the drip emitters 60, 65 and 70, there exist water inlet openings 72 that connect from the water supply conduit (that is not illustrated), water outlet openings 74 that connect unto a flow passage from the drip emitters towards the area that is to be irrigated. There exist also a throttle means 76 for decreasing the water pressure that is connected unto a water passage into it from water inlet openings 72 and to water outlet from it following the decrease in the water pressure—unto water outlet openings 74.

As drip emitters 60, 65 and 70 constitute regulated drip emitters, there exist in drip emitters 60, 65 and 70 an elastomer component 78 wherein at least one portion of it constitutes a regulating membrane 80 that its one side 81 is exposed to the water pressure that prevails in the water supply conduit and its other side is exposed to the reduced pressure of the water, as it flows inside the drip emitter towards the water outlet opening 74, so that a portion of the regulating membrane 80 is moveable in accordance with the differential water pressure that prevails on both sides of the portion.

From the constructional aspect, drip emitters 60, 65 and 70 are characterized by this that they are formed with an additional opening 82 that is exposed to the approximate atmospheric pressure prevailing at the water exit from the drip emitters.

Elastomer component 78 is formed with a membrane portion 84, wherein its one side 86 is strained against water outlet opening 72 for closing it and on its other side connected directly unto the additional opening 82 in order to open the water inlet opening and enable flow passage from the water supply conduit to the drip emitter, and this—from the instant that the force that is exerted by the water pressure prevailing in the water supply conduit, on the one side of the membrane portion, overcomes (first) the strain by which the membrane portion was stressed towards the water inlet opening and on the approximate atmospheric pressure that prevails on the other side of the portion.

In other words, in a drip emitter in accordance with the invention, the non-drain valve function is executed independently and is separated from the regulating function. At any given time, the membrane portion 84 that serves in it as the non-drain valve 88 sealing is exposed to the maximum differential pressure that prevails in the system—on its one side to the water pressure prevailing in the water supply conduit and on its other (second) side—to the approximate atmospheric pressure prevailing in the water flowing out from the drip emitter.

In drip emitters 60, 65 and 70, portion 84 of elastomer component 78 that serves—as is to be remembered, as the non-drain valve 88 sealing is exposed to the pressure prevailing in the water supply conduit on its one side and to the approximate atmospheric pressure on the other side (through an additional opening 82). From the time of assembling the drip emitters and also following it later—i.e., after coupling water inlet opening 72 to the pressure prevailing in the water supply conduit and as long the pressure in the conduit did not exceed a preset selected threshold value, the first portion 84 of the elastomer component 78 is stressed against the water inlet opening 72 to the drip emitter for creating a seal on the opening and while exposing the second side of the portion to the approximate atmospheric pressure prevailing at the water outlet opening from the drip emitter (through above cited additional opening 82).

Under these circumstances and in view of the description of the preferred embodiments of drip emitters in accordance with the invention as would be presented later on, any professional in this field would understand that the invention enables designing non-drain valves endowed with an opening—closing capability at high pressures and without influencing the drip emitter's regulating mechanism's performance nor would it entail complications or more expensive costs of the drip emitter's production.

As the pressure in the water supply conduit rises above the designed threshold value, the sealing is removed due to the action of the water pressure (in the water supply conduit) increased force over the one side of portion 84 and while overcoming the strain at which that first portion 84 was exposed against water inlet opening 72 to the drip emitter and the approximate atmospheric pressure prevailing at the water flow exit from the drip emitter.

The movement of portion 84 towards additional opening 82 that is connected as said, to the approximate atmospheric pressure prevailing at the water flow out from the drip emitter, causes the withdrawal of the sealing. Any professional in this field would understand that the movement of the portion 84 is maximal because the pressure difference acting on the portion is maximal—the water pressure prevailing in the water supply conduit on its one side and only the approximate atmospheric pressure that prevails on the other side. In contradistinction to prior art (see and compare with FIGS. 1*a* to 1*c*), in accordance with the invention, the non-drain valve sealing is not required for additional functioning and the maximal pressure difference prevailing in the system (water pressure in the water supply conduit versus the approximate atmospheric pressure prevailing at the water flowing out from the drip emitter) acts on the seal's surface area during all the stages of the drip emitter's operation.

A constructional element that is found in drip emitters 60, 65 and 70 is the existence of a connecting means 90 for exposing the one side 81 of regulating membrane 80 in the elastomer component to the pressure prevailing in the water supply conduit, and this—after opening the water inlet opening 72 to a flow passage into the drip emitter from the water supply conduit. But any professional in this field would understand that the invention might also be implemented in drip emitters in which one side 81 of regulating membrane 80 is constantly exposed to the water pressure that prevails in the water supply conduit.

At this stage, from the instant that the seal was removed (and as is depicted in the Figures), the water flow from water inlet opening 72 in drip emitters 60, 65 and 70 is routed in parallel both to throttle means 76 and from it, after it was used to decrease the water pressure, towards water outlet opening 74 and, in tandem and in accordance with the illustrated examples—through connecting means 90, to a one side 81 of the second portion 80 of an elastomer component 78.

From the time that the non-drain seal was removed and the water flow was routed, as cited above, in accordance with the illustrated examples, through connecting means 90 to one side 81 of portion 80, the water pressure unto which the one side 81 of portion 80 is exposed is the water pressure that prevails in the water supply conduit. Under these conditions, the regulating function would occur at every time that the differential water pressure, the pressure prevailing in the water supply conduit and on the one side 81 of sector 80, and the reduced water pressure of the water as it flows in the drip emitter towards the water outlet opening 74, would lead to propelling regulating membrane 80.

A regulating mechanism that reduces or increases the dimensions of the flow passage towards water outlet opening 74 is implemented in drip emitter 60. This refers to the reduced pressure of the water after emerging from throttle means 76 (see and compare to FIG. 1*a*). As per drip emitter 65, in which a regulating mechanism of the type that decreases or increases the effective length of the throttle means 76 is implemented, the reference applies to the reduced pressure of the water after it passed at least through one sector of the throttle means 76 (for reasons of convenience, only one throttle means from the three ones that are illustrated as they are located along the throttle means was designated a number, see and compare with FIG. 1*b*). Referring to drip emitter 70, in which as said, a regulating mechanism that decreases and increases the dimensions of the flow passage formed in the throttle means is implemented, the reference applies to the constantly reduced pressure of the water while passing at the throttle means 76 located opposite regulating membrane 80 (for convenience reasons, the preceding sector of the throttle means is not numbered, see and compare with FIG. 1*c*).

As might be discerned at ease, in drip emitters 60, 65 and 70 that are illustrated solely as an example of preferred embodiments, the regulating and the non-drain functions are separated one from the other while using only one single elastomer component—78. In other words, from the elastomer component 78, that is the sole elastomer component in drip emitters 60, 65 and 70, a first portion 84 is designated to serve as the non-drain valve sealing 88 and another portion 80, is designated to be used as the membrane of the regulating mechanism. However, any professional in this field would understand that the invention is amenable to be implemented also in drip emitters in which separate and dedicated elastomer components are installed—one to be used as the non-drain valve sealing, and the other—or several of them, for the regulating mechanism applications.

Referring to FIGS. 3 and 4. These figures constitute exploded views taken at different angles, of the components of an example drip emitter 100 in accordance with the invention. Drip emitter 100 is of the flat drip emitters type that are adapted for installing inside the water supply conduit (that is not illustrated), during its continuous manufacturing process (e.g., by an extrusion process), and while allowing for a flow passage enabling continuation of the water passage along the length of the conduit.

Drip emitter 100 is assembled from only three components: housing assembly 193, cover component 195 and elastomer component 178.

Housing assembly 193 is formed as an essentially flat, rectangular component that is manufactured, for example, by injecting polymeric material into molds. It is formed with an inner space 201. The water inlet opening 172 to drip emitter 100 is formed inside inner space 201 and upon installing the drip emitter in the water supply conduit (that id not illustrated) connects to a water flow passage from the water supply conduit to inner space 201. Water inlet opening 172 is formed with a circumferential shoulder 203 protruding into the inside of inner space 201 of the housing assembly. Housing assembly 193 is formed with a circumferential bracket 295 formed around inner space 201.

Cover component 195 is also formed as an essentially flat, rectangular component that is also manufactured, for example, by the injection of polymeric material into molds process. Cover component 195 fits by its dimensional aspects to being affixed unto circumferential bracket 205 of housing assembly 193 (for example, by ultrasonic welding).

Cover component 195 is formed on its one end 207 with a water outlet opening 174. On affixing the cover unto the housing assembly, the water outlet opening 174 connects to a water passage from inner space 201 of the housing assembly to the side 209 of the cover component.

Cover component 195 is formed on its other end 211 with an additional opening 182. On affixing the cover unto the housing assembly, this additional opening 182 connects inner space 201 unto the external side 209 of the cover component.

The external side 209 of the cover component is formed with a circumferential protrusion 213 that bounds a sector 215 extending on the external side of the cover component almost along its entire length, wherein within sector 215 there are formed both water outlet opening 174 and additional opening 182.

Circumferential protrusion 213 is suited in its dimensions to being affixed on the inner wall of the water supply conduit (not illustrated) at less than half of its circumference in a width cross section, and as it can be discerned in the illustrated example, circumferential protrusion 213 is formed in an arched outline on its two ends (in the vicinity of the ends 207, 211 of the component), in order to adapt it in advance to the anticipated geometry of the water supply conduit's inner wall, unto which the drip emitter is intended to be affixed (for example, by heat welding wherein the heat generated in the wall of the conduit after passing an extrusion process is exploited for this purpose).

Any professional in this field would understand that sector 215 constitutes the bottom of the "exit pool" of the water from drip emitter 100, in a manner such that a passage hole or groove formed at the water supply conduit wall would connect between it and the surface area intended to be irrigated.

Any professional in this field would also understand that during the operation of the drip emitter and also following it, when the irrigation would be terminated, the pressure prevailing within the "exit pool" is the approximate atmospheric pressure.

In the illustrated example, water outlet opening 174 and additional opening 182 formed in the cover component, are formed on the inner side 217 of the cover component and around the circumferences of the openings, each one with a dent whose walls converge towards the opening and is essentially oval, wherein the length of the dent in the direction of the length of the cover is longer than its width (for example, by approximately 40%).

Elastomer component 178 is also formed as an essentially flat, rectangular component, and is manufactured for example, from synthetic or natural rubber. Elastomer component 178 is suited in its dimensions to being affixed within inner space 201 of the housing assembly and being located in this space opposite the inner side 217 of cover component 195.

Elastomer component 178 is integrally formed (still during its manufacturing process) with two spaces—first space 219 and second space 221, formed as they are embedded in one end of it 223, one opposite the other on its two sides, space 219 on the 225 side and space 221 on the 227 side. Two additional spaces—third space 229 and fourth space 231, formed as they are embedded at the other end 233 of the component, also one opposite the other on its two sides, space 229 on the 225 side and space 231 on the 227. Portion 184 separates between the first and second spaces and portion 180 separates between the third and fourth spaces.

In addition, elastomer component 178 is integrally formed (still during its manufacturing process) with throttle means 176. In accordance with the illustrated example, throttle means 176 is formed in elastomer component 178 as a flow passage 235 that extends as it is embedded on the two sides of the elastomer component—on the 225 side and on the 227 side. Throttle means 176 includes a first labyrinth means 237 formed on that one side 225 of elastomer component 178. Labyrinth means 237 is connected at its one end 239 to a flow passage into it from first space 219 and includes an array of baffles 241 protruding into flow passage 235.

Throttle means 176 includes in addition a passage opening 243 wherein on one side 225 of the elastomer component it is connected unto a flow passage into it from the second end 245 of the first labyrinth means 237 and to a flow passage in it towards the other side 227 of the elastomer component.

Furthermore, throttle means 176 includes second labyrinth means 247 formed at the other side 227 of elastomer component 178. Labyrinth means 247 is connected on its one end 249 unto a flow passage into it from passage opening 243 and on its other end 251, connected to a flow passage from it into the fourth embedded space 231, and it includes too, a baffles array 253 protruding into flow passage 235.

In the illustrated example, elastomer component 178 is integrally formed (still during its manufacturing process) with connecting means 190. Connecting means 190 is formed as an embedded passage 255 that extends on one side 225 of the elastomer component. The embedded passage 225 is connected on its one end 257 to water flow into it from the first space 219 and on its other end 259, it is connected to the third embedded space 229.

It is to be emphasized that the connecting means is not a part of the throttle means. Indeed, in the illustrated example— embedded passage 225 illustrated as it includes baffles that protrude into it, but this relates solely to manufacturing considerations and verily, embedded passage 225 might as well be similarly formed as an open channel with no baffles. In the absence of a flow exit for the water, from the time the water enters space 219 and passes through connecting means 190 to space 229, then in those spaces there would soon exist the same pressure conditions. In other words, connecting means 190 is not a part of throttle means 176 in the case wherein there exists no outlet for the water that passes from space 219, via connecting means 190 and arrives at space 229. Under these conditions, rather soon the same pressure conditions would prevail in space 219 and 229.

Any professional in this field would understand that in the preferred embodiment illustrated as an example only in the figures (and see herein after when referring to FIGS. 7 to 9), connecting means 190 serves to expose one side of the regulating membrane portion of elastomer component 178 to the pressure prevailing in the water supply conduit, and this only after opening the water inlet opening to a flow passage towards the drip emitter from the water supply conduit.

Referring to FIGS. 5 and 6. These figures constitutes views in perspective at different angles of drip emitter 100 whose components were illustrated in FIGS. 3 and 4, wherein it is assembled and ready to be installed within the water supply conduit (not illustrated).

Regular operation of the drip emitter (as would be explained herein after when referring to FIGS. 7 to 10), mandates its assembly while maintaining exact orientation and aligning relations between its various components. Upon assembling elastomer component 178 and locating it within inner space 201 of housing assembly 193 and affixing cover component 195 unto circumferential bracket 205 of the housing assembly, then first embedded space 219 has to be located opposite water inlet opening 172 and second embedded space 221 has to be located opposite additional opening 282. Under these assembly conditions fourth embedded space 231 would become located opposite water outlet opening 174.

Any professional in this field would understand that it is beneficial to execute the assembly of the three components of drip emitter 100 using mechanization and automation. In order to alleviate the task of such an assembly (consider once again FIGS. 3 and 4), housing assembly 193 is formed with openings 261 and 263—and elastomer component 178 is formed with matching protrusions 265 and 267. Thus, when an assembly at the correct orientation of elastomer component 178 inside inner space 201 of housing assembly 193 is performed, then—as can be seen in FIGS. 5 and 6, protrusions 265 and 267 are included within matching openings 261 and 263 (and obviously, the assembly is not enabled except when the right alignment exists between the two components).

Any professional experienced in this field will understand that a similar array of protrusions and openings might be implemented as well between the housing assembly and the cover component. Alternatively, it is also possible to form the cover component in a symmetric shape in its lengthwise dimension, in a manner that would enable its proper assembly in any direction whatsoever as referred to this dimension (in accordance with the illustrated example—whether with end 211 pointing to end 223 of the elastomer component or if end 207 is the one that points towards the same end of the elastomer component). In other words, it is feasible to form the water outlet opening 174 and the additional opening 182 as openings identical one to the other and at a location relatively similar on the surface of the cover component, and thus enable assembling the cover in any direction whatsoever.

Moreover, any professional in this field would understand that coupling the protrusions and the openings enables a visual examination of the elastomer component even following the drip emitter assembly stage. Hence, by selecting an appropriate pigmentation during the process of manufacturing the elastomer component, it is possible to dedicate a specifically characterizing color to one elastomer component that is formed with a selected throttle means and a regulating membrane portion that are attuned to provide a given throughput (flow rate) while selecting a different pigmentation color to a unit with a different selected throughput (flow rate) and so on, wherein the cover components and the housing assemblies remain identical (the identification of the drip emitter would be made by visually inspecting the color of the elastomer component which can be observed from the outside, as the, by observing the color of its protrusions).

In FIG. 6, it is possible to discern a filter means 269. This filter means 269 is formed at the bottom (lower side) of housing assembly 193, the side wherein upon assembling drip emitter 100 within the water supply conduit faces the interior of the conduit. Any professional in this field would understand that filter means 269 is intended for filtering contaminants away from the water before it penetrates through water inlet opening 172 into the inside of drip emitter 100 and that it is preferable that the flow passages of the filter means 269 would hence be of smaller dimensions than the dimensions of the minimal flow passage formed in throttle means 176.

Referring to FIGS. 7 to 9. These figures constitutes lengthwise cross section views of drip emitter 100 wherein it is already affixed unto an inner wall 271 of a water supply conduit 273 (into which it was inserted, for example, during the manufacturing process of the conduit by extrusion, employing techniques that are recognized and known to professionals in this field from past experience). Drip emitter 100 is illustrated in those figures in several different modes of operation, as follows herein under.

FIG. 7 illustrates drip emitter 100 at its "paused" state—the non-drain valve 188 is closed; FIG. 8 illustrates drip emitter 100 at the "opening" stage of the non-drain valve 188 when the pressure is increasing in conduit 273; FIG. 9 illustrates drip emitter 100 at the "undergoing regulation" state—non-drain valve 188 is in the "open" state and the regulating membrane portion 180 is stretched towards water outlet opening 174 and decreases the dimensions of the water flow passage into it.

Upon installing elastomer component 178 and locating it within inner space 201 of housing assembly 193 and affixing cover component 195 unto circumferential bracket 205 in the housing assembly, the flow passages in throttle means 176 and connecting means 190 (that are not shown in the cross section views, see FIGS. 3 and 4), are defined and bounded by inner space 201 and inner side 217 of cover component 195.

Regulating membrane 280 constitutes a portion of elastomer component 178, the portion that separates between third space 229 and fourth space 231 that are formed in elastomer component 178.

The sealing of non-drain valve 188 is a portion 184 of the same elastomer 178, namely the portion that separates between first space 219 and second space 221 that are formed in elastomer component 178.

In other words, in the illustrated example, first portion 184 of elastomer component 178 has been designated to be used as the seal of the non-drain valve and second portion 180 of the same elastomer component 178 itself, was designated to be used as the regulating mechanism's membrane.

Affixing drip emitter 100 to inner wall 271 of conduit 273, defines and bounds the "exit pool" 275 of the drip emitter.

In the "paused" state of the drip emitter that is illustrated in FIG. 7, first portion 184 is strained and biased against the circumferential shoulder 203 of water inlet opening 172, for creating a non-drain valve 188. In this state, the water pressure prevailing in conduit 273 acts against a relatively small area of portion 184 and this is not enough to overcome the strain at which portion 184 was stressed against circumferential shoulder 203 of water inlet opening 172 from the time the drip emitter's components were assembled and on the atmospheric pressure prevailing in space 221 (due to connecting the space via an additional opening 182 unto the "exit pool" 275 from the drip emitter).

In the state of affairs illustrated in FIG. 8, the rise of the water pressure in water supply conduit 273 leads to opening the non-drain valve 188. The water pressure prevailing in the conduit overcomes the strain at which sector 184 was stressed against circumferential shoulder 203 of water inlet opening 172 and overcomes as well the approximate atmospheric pressure prevailing in space 221 and initiated movement of portion 184 towards additional opening 182 while simultaneously removing the sealing from the water inlet opening and opening the flow passage into space 219.

In this state, the water flows from the conduit into space 219. The water pressure acts now against the entire surface area of portion 184. Any professional in this field would understand that such a configuration, in which from the time the sealing was removed the entire surface area is exposed to the water pressure leads to fast and progressive increase of the dimensions of the flow passage and prevents a chocking phenomena of the sealing backwards toward the water inlet opening, and this—for as long as the water pressure in the conduit did not drop to below the preset threshold value that might be relatively high. The fact that in accordance with the invention, in drip emitter 100 sector 184 serves solely for the non-drain function and is exposed on its other side to the approximate atmospheric pressure, enables to design the opening of the non-drain valve at a desired preset threshold value that might be relatively high. Locating the additional opening 182 on the side of—and adjacent to—water outlet opening 174, ensures that stressing sector 184 is influenced, eventually, only by the water pressure prevailing in the conduit (because at the water outlet opening from the drip emitter and near to it the approximate atmospheric pressure prevails), and it is feasible to design sector 184 regarding its aspects of shape, thickness, cross section and initial strain, without resorting to any limitations whatsoever.

Any professional in this field would understand that implementing the invention in an embodiment that designates different and dedicated sectors of the same elastomer component to the regulating and to the non-drain functions (as illustrated in the figures), or in an embodiment in which two different elastomer components are used, enables to utilize a specific design of each one of the portions, for example, regarding the shape of the portion (rectangular, round, square, oval), size of the portion's surface area, thickness of the portion, shape of its cross section, distance of the elastomer component from the anchoring point. These aspects necessarily influence the mode of the specific portion behavior as it applies to stretching and bending, and it is feasible then, to design the movement of the sectors with due consideration given to them.

In accordance with the illustrated example, the water flow that enters space 219 is directed from it in parallel both to throttle means 176 (that is not shown in the cross section rendition but see FIGS. 3 and 4), and from it, after the water pressure through it has been decreased, to space 231 that is connected to water flow from it towards water outlet opening 174, and as well—via connecting means 190, to space 229 that is located on the other side of sector 180. Any professional in this field would understand that in the absence of a flow outlet for the water that was routed to space 229, actually the water pressure existing in the water supply conduit is the pressure prevailing in space 229. The water flowing from water outlet opening 174 arrives at "exit pool" 275 wherein the pressure there is the approximate atmospheric pressure and is shed from it, in the illustrated example—through slot 277 formed at the wall of the conduit towards the surface area intended to be irrigated. Any professional in this field would understand that the shedding of the water from the conduit might be executed through a variety of different kinds and shapes of openings, for example—a round hole, slot, "horseshoe" like, directional slot and so on.

In the situation illustrated in FIG. 9, the water pressure in water supply conduit 273 rose in a manner that might have endangered the required throughput, hence a regulating action is being executed so that it maintains an essentially constant throughput through the drip emitter. The rising water pressure in the conduit is translated to more power that is being exerted upon portion 184 of elastomer component 178. Hence, portion 184 is stressed more strongly, towards additional opening 182; in the illustrated example—until it develops a contact with it, while (concurrently) increasing the dimensions of the available flow passage into the drip emitter and obviously retaining the non-drain valve 188 in its open state. Simultaneously, the water pressure in space 229 rises and exerts more force on the one side 181 of regulating membrane portion 180. In the situation illustrated in the figure and as any professional would understand, the regulating mechanism action is conducted in accordance to the differential pressure prevailing on the two sides of portion 180, wherein portion 180 is stressed and moves towards water outlet opening 174 while reducing the dimensions of the water flow passage into it.

Any professional in this field would understand that in the regulating situation depicted in the figure, if a contaminant existing in the water would manage to pass through filter means 269, passing then through water inlet opening 172, continues and passes also through throttle means 176 and get stuck or accumulate in the water outlet from the throttle means, then self rinsing or flushing would occur due to the momentary retreat of portion 180 from water outlet opening 174. A retreat that due to the splitting of the regulating and no drain functions in drip emitter in accordance with the invention, would not be linked to the degree of strain of portion 184 and hence would not be limited by it.

Referring to FIG. 10. The figure constitutes a width cross section view of drip emitter 100 illustrated in the regulating stage at which it is shown in FIG. 9 (along the a-a cross section that is marked there).

In accordance with the illustrated drip emitter example, the regulating membrane portion 180 and the non-drain sealing 184 are actually stressed for stretching during their operation, because the elastomer component 178 in which they both are formed, is anchored around its circumference to housing assembly 193 and to cover component 195 in a manner that ensures also the sealing of the various spaces and passages formed in the drip emitter.

In accordance with the illustrated example, anchoring elastomer component 178 is accomplished by integrally forming it (as before, while it is being manufactured) on its two sides, with protrusions 277 and 279 around its circumference. Inner space 201 of housing assembly 193 is formed with an embedded groove 281 around its circumference. A groove that matches the circumferential protrusion 279 is formed on the one side of elastomer component 178. Cover component 195 is formed on its inner side 217, the side that upon affixing it to circumferential bracket 205 of housing assembly 193 faces inner space 201, with an embedded groove 283 around it circumference. A groove that matches circumferential protrusion 277 is formed on the other (second) side of elastomer component 178. Thus, on assembling elastomer component 178 within inner space 201 of housing assembly 193 and affixing cover component 195 unto circumferential bracket 205 of the housing assembly, protrusions 277 and 279 that are formed on both sides of the elastomer component, are included within embedded grooves 281 and 283 that are formed in the inner space of housing assembly 193 and in cover component 195 and anchor the elastomer component around its circumference to the housing assembly and to the cover component.

Any professional in this field would understand that anchoring elastomer component 178 in a manner that ensures sealing and stressing of the regulating mechanism's membrane's portion and the non-drain valve sealing for stretching, might be executed also by other means (for example, tightening the cover component unto the housing assembly by exerting pressure in a manner that bounds and anchors the edges of the elastomer component between them).

Moreover, in the illustrated embodiment of drip emitter 100, upon installing elastomer component 178 and locating it within inner space 201 of housing assembly 193 and affixing cover component 195 unto circumferential bracket 205 in housing assembly 193, the larger part of the elastomer component's surface area are tightened as a "sandwich" between the housing assembly to the cover component 193 in a manner that ensures that the portions of regulating membrane 180 and non-drain valve sealing 184 would be exposed during their operation, to stretching strains that are essentially local.

In addition—in the illustrated example, it is possible to discern the manner of stretching of a portion of the regulating membrane 180 towards the water outlet opening 174, while stretching the portion towards the dent that is formed (and shown in the illustrated example) at the inner side 217 of the cover component and around the circumference of the opening, with a dent whose walls converge towards the opening and is essentially oval, wherein the length of the dent along the length dimension of the cover component is larger than its width (for example by approximately 40%), in a manner that due to forming the membrane's portion 180 in a rectangular configuration, alleviates achieving the action of convergence of the membrane (by stretching) towards the opening. In the illustrated example, a similar dent is also formed around an additional opening 182—and for a similar goal.

It is important to note that drip emitter 100 that was described above when referring to FIGS. 3 to 10, is only an example serving our descriptive needs for presenting the manner by which it is feasible to implement the invention in regulated drip emitters. Herein after we shall describe a different example that, naturally, due to the wide coverage dedicated to drip emitter 100, the description of the additional example would be much more succinct, assuming that the professional reader would be able to rely on the presented material and extrapolate the details to the new example (with the applicable obvious variations due to the different construction).

Referring to FIGS. 11 and 12. These figures constitute an exploded view from different angles of the components of yet another example of drip emitter 300 in accordance with the present invention. Drip emitter 300, similarly to drip emitter 100 that was described herein above when referring to FIGS. 3 to 10, is also one of the kind of the flat drip emitters type that are suited to be installed within a water supply conduit (not illustrated) during the continuous manufacturing process of the conduit (for example using an extrusion process) and while leaving a flow passage gap enabling the streaming water in the conduit to keep flowing.

Drip emitter 300, as it predecessor—drip emitter 100, is also assembled from only three components: the housing assembly 393, cover component 395 and elastomer component 378.

Housing assembly 393 is formed as an essentially flat, rectangular component that is manufactured, for example, by injecting polymeric material into molds. It is formed with an inner space 401, first space 419 that is embedded in a one end 423 of inner space 401, and second space 429 embedded at the other end 433 of inner space 401. Water inlet opening 372 is formed in the first space 419 with a circumferential shoulder 403 that protrudes into inner space 401 of the housing assembly and connects to a flow passage from the water supply conduit (not illustrated) to inner space 401.

In drip emitter 300, in accordance with the illustrated example, housing assembly 393 is formed with a first sector 404 of throttle means 376. Sector 404 is formed within the housing assembly as a passage means 435 embedded in inner space 401 and includes first labyrinth means 437. First labyrinth means 437 is connected at its one end 439 to a flow passage into it from first space 419 and includes an array of baffles 441 protruding into the flow passage.

In accordance with the illustrated example, connecting means 390 is formed in housing assembly 393 of drip emitter 300. Connecting means 390 is formed in the illustrated example as an open channel 455 that is formed wherein it is embedded in inner space 401 and connected at its one end 457 to water flow entering into it from inner space 419 and at its other end 459 it is connected to second embedded space 429.

Circumferential bracket 405 is formed in the housing assembly around inner space 401.

Cover component 395 is formed as an essentially flat, rectangular component that might be manufactured by the injection of a polymeric material into molds. Cover component 395 fits by its dimensions to be mounted on circumferential bracket 405 of housing assembly 393 (for example, by ultrasonic welding).

In accordance with the illustrated example of drip emitter 300, cover component 395 is formed on its one side 417—which is the side that upon affixing the cover unto the circumferential bracket would face the inner space of the housing assembly, with first space 431. First space 431 is formed wherein it is embedded in one end 407 of the cover component.

In first space 431 water outlet opening 374 is formed. Water outlet opening 374 connects to a flow passage from the inner space of the housing assembly to the external side 409 of the cover component.

Cover component 395 is formed at its inner side 417, also with a second space 421. Second space 421 is formed embedded at the other (second) end 411 of the cover component.

An additional opening 382 is formed in second space 421. It connects the inner space of the housing assembly unto the external side 409 of the cover component.

Cover component 395 is formed at its inner side 417, also with the second sector 406 of throttle means 376. The second sector 406 is also formed as a flow passage 435 embedded in the cover component and including second labyrinth means 447 connected on its one end 449 to a flow passage into it that—as would be clarified herein after, arrives from the second end 445 of the first labyrinth means (formed in the housing assembly) and from it the flow continues and reaches the first embedded space 431 formed at the cover component. The second sector 406 also includes an array of baffles 453 protruding into flow passage 435.

As can be seen, similarly to the configuration of drip emitter 100 that was described comprehensively above when referring to FIGS. 3 to 10, the cover component of drip emitter 300 is formed as well on its external side, with a circumferential protrusion that bounds a sector from the external side of the cover component, wherein inside the sector there are formed both the water outlet opening 374 and additional opening 382. The protrusion is adapted being affixed unto the inner wall of the water supply conduit in less than half of its width circumference cross section and formed in an arched outline on its two ends, in a manner that it fits the expected outline of the inner wall of the water supply conduit unto which it is intended to be affixed.

In accordance with the illustrated example, elastomer component 378 in drip emitter 300 is formed as an essentially flat rectangular component and it can be manufactured from synthetic or natural rubber. Elastomer component 378 is suited by its dimensions to be installed within the inner space of the housing assembly and being located in the space opposite the cover component.

In a variation from elastomer component 178 installed in drip emitter 100 as was described above when referring to FIGS. 3 to 10, elastomer component 378 installed in drip emitter 300 is not formed with various spaces, connecting means and throttle means, but rather with a passage opening 443.

On installing the components of drip emitter 300, passage opening 443 would be connected unto a water flow passage into it from the second end 445 of first labyrinth sector formed in the housing assembly, and from it the flow continues to the one end 449 of the second labyrinth means formed in the cover component.

Referring to FIG. 13. This figure constitutes a lengthwise cross section view of drip emitter 300 whose components were illustrated in FIGS. 11 and FIG. 12, wherein drip emitter 300 is already assembled and affixed unto an inner wall 471 of water supply conduit 473. Drip emitter 300 is illustrated in the figure wherein it is found at its regulating state—the non-drain valve 388 is in its open state and the regulating membrane portion 380 is stretched towards water outlet opening 374 and decreases the dimensions of the water flow passage toward it.

Upon assembling elastomer component 378 and locating it within the inner space of the housing assembly 393 and affixing cover component 395 unto the circumferential bracket of the housing assembly, second embedded space 429 formed in the housing assembly is located opposite water outlet opening 374 that is formed in the cover component. Water inlet opening 372 formed in the housing assembly is located opposite additional opening 382 formed in the housing assembly. Under these conditions, the flow passages in throttle means 376 and connecting means 390 (not seen in the cross section view but see FIGS. 11 and 12) are defined and bounded by elastomer component 378 that is anchored around its circumference and position as a "sandwich" between the housing assembly and the cover component.

Regulating membrane 380 constitutes a portion of elastomer component 378. The portion that upon assembling the components of drip emitter 300, separates and buffers between second space 429 that is formed in the housing assembly to second space 431 that is formed in the cover component (portion 380 is marked by a dashed line in FIGS. 12 and 13).

The sealing of the non-drain valve 388 is a portion 384 of elastomer component 378, the portion that upon assembling the components of drip emitter 300 separates and buffers between first space 419 formed in the housing assembly to first space 421 that is formed in the cover component. In the drip emitter's "paused" state, portion 384 is strain and biased against circumferential shoulder 403 of the water inlet opening 372 for creating the non-drain valve 388.

Any professional in this field would understand that not withstanding the constructional differences between drip emitter 100 that was described above referring to FIGS. 3 to 10 and drip emitter 300 described referring to FIGS. 11 to 13, the mode of operating of the drip emitters is similar and they provide the same advantages that the invention imparts on them (as we pointed herein above, and would elaborate on this topic herein after).

It is important to note that drip emitters 100 and 300 that were described above referring to FIGS. 3 to 10 and 11 to 13, respectively, are of the type in which a regulating mechanism that decreases or increases the water flow passage towards the water outlet opening after the water emerges from the throttle means. However, the present invention is not restricted as it concerns the type of regulating mechanisms that are installed in the drip emitters in which it is desired to implement it. For example and as we will demonstrate herein after, it is feasible to implement the invention also in drip emitters of a type wherein a regulating mechanism that decreases or increases the water flow passage that is formed in the throttle means itself. Relying on the details that were presented when referring to drip emitters 100 and 300, the additional example would be described more succinctly presuming that the learned professionals would be able to apply the given information—borrowing (mutatis mutandis) and applying the changes as the similarity deserves.

Referring to FIGS. 14 and 15. These figures constitute exploded views (taken from different angles) of the components of yet an additional example of a drip emitter 500 in accordance with the invention. Similarly to drip emitters 100 and 300 that were described when referring to FIGS. 3 to 14, drip emitter 500 is also one of the kind of flat drip emitters type that are suited to be installed within a water supply conduit (not illustrated) during the continuous manufacturing process of the conduit (for example using an extrusion process) and while allowing for a flow passage gap enabling the streaming water in the conduit to keep flowing.

Drip emitter 500, as it predecessors—is also assembled from only three components: the housing assembly 593, cover component 595 and elastomer component 578.

Cover component 595 is formed with a water outlet opening 574 and an additional opening 582.

At this stage and based on the accompanying figures, any professional in this field would understand that drip emitter 500 is similar to emitter 100 described above (refer to FIGS. 3 to 10) in several constructional aspects, but in contradistinction to it, the regulating mechanism of drip emitter 500 is of the type in which the increasing or decreasing of the water passage is taking place along the length of sector 676 of throttle means 576. In the illustrated example, the regulating function is implemented by movement of sector 676 of throttle means 576 that is formed—itself—in the regulation movable membrane 580, towards the flow passage and away from it. In other words, in drip emitter 500, a sector from the throttle means is formed in the regulating membrane whose one side is exposed to the pressure prevailing in the water supply conduit and its other side is exposed to the constantly reduced pressure of the water as it passes through the throttle means, so that the sector of the regulating membrane is moveable for affecting changes in the dimensions of the water flow passage through the throttle means while the affected throttle means is formed in the moveable regulating membrane itself.

Referring to FIG. 16. This figure constitutes a lengthwise cross section view of drip emitter 500 whose components were illustrated in FIGS. 14 and 15. Drip emitter 500 is illustrated as it is affixed unto an inner wall 671 of water supply conduit 673 and is found in its "paused" state—the non-drain valve 588 is closed.

While in this state, the water pressure prevailing in conduit 673 is operating against a relatively small area of surface area 586 of portion 584 and this is not enough to overcome the strain at which portion 584 was stressed against circumferential shoulder 603 of water inlet opening 572 and on the approximate atmospheric pressure prevailing in space 621 (due to connecting the space to an "exit pool" 675 from the drip emitter through an additional opening 582).

As the pressure in water supply conduit 673 rises above the designed threshold value, the sealing by non-drain valve 588 will be removed and the water flow would be routed, concurrently, both to throttle means 576 and away from it, after the water pressure is decreased by its action, to space 631 that is connected to a flow passage from it unto outlet opening 574, and as well—through connecting means 590, to space 629 that is located on the second side of portion 580.

With an additional rise of the water pressure, the regulation operation would occur in accordance with the differential water pressure prevailing on the two sides of portion 580, wherein portion 580 would be stressed and move towards the inner side 617 of cover component 595, while pressing more intensely sector 676 of throttle means 576 against the cover component and reducing the dimensions of the flow passage 635 formed in this sector of the throttle means. Any professional in this field would understand that it is feasible to design sector 676 in such a manner that portion 580 would be stretched and move towards the inner side of cover component 595 in an equal and simultaneous mode along the entire length of throttle sector 676 not withstanding the pressure differences of the water as it passes along sector 676 (and see IL 119237 patent of the applicant in this respect).

Considering the descriptions that were presented above relating to drip emitters 100, 300 and 500 while referring also to the accompanying figures, any professional would understand that the invention provides for a regulated drip emitter equipped with an independent non-drain valve that enables opening-closing of the valve even at relatively high pressures in the water supply conduit, wherein the water flow passage that is opened when at the designed pressure (that might be relatively high), the sealing is removed from the non-drain valve, is relatively wide in its dimensions and remains relatively wide during the entire duration of the drip emitter's operation.

In a drip emitter in accordance with the invention, removing the sealing from the non-drain valve and leaving the water flow passage through it in the open state at any stage of the drip emitter's operation, is dependent only on the capability of the force exerted by the water pressure prevailing in the water supply conduit to overcome the strain at which the sealing of the non-drain valve was biased towards the water inlet opening to the drip emitter and on the approximate atmospheric pressure prevailing on the other side of the seal.

A drip emitter in accordance with a preferred embodiments of the invention, enables the manufacturing and assembling of the unit with ease—as it is inherently simple, coupled with relatively low cost as a consequence of the small number of components it is made of. Any one of drip emitters 100, 300 and 500—includes only one elastomer component wherein one portion of it is designated to provide the non-drain valve sealing and a second portion from it serves as the regulating membrane.

Any professional in this field would understand that at least drip emitters 100 and 300, namely the drip emitters in which the regulating mechanism is of the type that increases or decreases the dimensions of the water flaw passage after the water passed and emerged from the throttle means, maintain the advantage of the differential regulation principle (self rinsing or flushing) and enable the forming of their own throttle means, with relatively large flow passages (while at the same time reducing the phenomena of getting clogged).

Moreover, based on the descriptions presented above relating to drip emitters 100, 300 and 500 and with reference to the accompanying figures, any professional would understand that in the operational mode of these emitters, a new and innovative method for separating the non-drain function from the regulating function is embodied.

This method is characterized by this that during the process of all the stages that characterize the operation of a regulated drip emitter having a non-drain valve—the stages of closing the non-drain valve, opening the non-drain valve, reducing the water pressure as it passes through the drip emitter towards the water outlet opening from the drip emitters and the regulation stage, the portion of the drip emitter's elastomer component that provides the non-drain valve function is exposed, on its one end—to the water pressure in the water supply conduit, but on its second side, only to the approximate atmospheric pressure.

In accordance with drip emitters 100, 300 and 500 described herein above only as preferred embodiments, the method includes a preliminary stage of designating a first portion of the drip emitter's elastomer component to be used as the non-drain valve and a second portion from the same elastomer component itself to be used as the drip emitter's regulating mechanism membrane.

In addition, in accordance with drip emitters 100, 300 and 500 described herein above only as preferred embodiments, the method includes a stage of routing the water flow from the water inlet opening into the drip emitter, from the instant that the sealing of the non-drain valve was removed, simultaneously—both towards the throttle means and from it, after it reduced the water pressure in it, towards the drip emitter's water outlet opening and at the same time towards the one side of the elastomer component's portion that serves as the regulating mechanism's membrane, so that this portion is moveable in accordance with the differential water pressure prevailing on its two sides.

Any professional would also understand that the present invention is not limited by the type of the regulating mechanism implemented in the drip emitter. Verily, in drip emitters 100 and 300 described herein above, a regulating mechanism of the type in which there exists a decreasing or increasing of the dimensions of the water flow passage of the water (after it emerged from the throttle means) towards the water outlet opening was cited, and as per drip emitter 500 described herein above, the regulating mechanism implemented is of the type in which the decreasing or increasing of the dimensions of the water flow passage formed along the throttle means was cited. But based on the description and the accompanying figures, any professional would understand that the invention might also be implemented in drip emitters in which any other regulating mechanism would be installed, for example—a mechanism in which the decreasing or increasing of the effective length of the throttle means is used (see FIG. 2b), a mechanism in which the decreasing or increasing of the water passage formed along the throttle means is implemented through the movement of a regulating membrane towards the flow passage and from it—or a combination of mechanisms of the types presented herein above.

At this stage, any professional would understand that the present invention is not constrained by the type of the drip emitter. Verily, drip emitters 100, 300 and 500 described herein above are of the flat type adapted for being installed inside the water supply conduit during the continuous process of manufacturing (for example, by extrusion process), and while allowing for a gap to be maintained for enabling the continued water passage through the conduit. But this was done solely due to considerations of convenience. As said, any professional would understand that only implementation examples of the present invention were presented, and the present invention is also applicable to other and different types of regulated drip emitters. Not only drip emitters that are affixed unto the inner wall of the water supply conduit (flat or round), but also amenable to drip emitters that are located along the length of the water supply conduit between sectors of the conduit, and also drip emitters that are stuck into the conduit or affixed to it from the outside.

Any professional would understand that the present invention was described above solely in a way of presenting examples, serving our descriptive needs and those changes or variants in the structure of the drip emitter—the subject matter of the present invention, would not exclude them from the framework of the invention. For example, changes or variants by way of dedicating two separate elastomer components to serve the non-drain valve and the regulating mechanism functions, forming throttle means with additional sectors (for example, a preceding sector such as labyrinth), exposing the regulating membrane directly and in a constant manner to the water pressure prevailing in the conduit (without using a connecting means that starts operating only after the non-drain valve is opened), propelling the regulating membrane during the regulation operation stage—not directly towards the water outlet opening but rather to the side of it, locating the additional opening not exactly opposite the center of the non-drain valve and similar "variations". In other words, it is feasible to implement the invention as it was described above while referring to the accompanying figures, also with introducing changes and additions that would not depart from the constructional characteristics of the invention nor from the method embodied in drip emitter's operation according to it, characteristics and the methods that are claimed herein under.

The invention claimed is:

1. A drip emitter unit that comprises:
   a water inlet opening connectable to a water flow passage from a water supply conduit unto said drip emitter;
   a water outlet opening connectable to a water flow passage from said drip emitter towards a surface area intended to be irrigated;
   an additional opening exposable to an approximate atmospheric pressure prevailing from the water outlet of the drip emitter;
   throttle means for decreasing pressure stemming from a water flow passage between the throttle means and the water inlet opening, thereby allowing fluid to flow out towards the water outlet opening with a decrease in pressure;
   at least one elastomer component in which at least one portion of it constitutes a regulating membrane with one side exposable to pressure from the water supply conduit and the other (second) side exposable to reduced pressure of the water as it flows towards the water outlet opening, so that said membrane portion is movable in accordance with differential pressure on the two sides of at least one portion of the regulating membrane; and
   an additional elastomer membrane portion that is strained and biased against the water inlet opening, creating a seal, with one side acting as a non-drain valve and the other (second) side connected to the additional opening, and wherein:
   said elastomer membrane portion is movable towards the additional opening in order to open the water inlet opening, enabling passage from the water supply conduit to the drip emitter, from the instant that force exerted on one side of the portion by pressure from the water supply conduit overcomes the strain at which the portion was strained and biased against the water inlet opening, as well as the approximate atmospheric pressure prevailing on the other side of the portion.

2. A drip emitter in accordance with claim 1, wherein:
   said drip emitter further comprises a connecting means for exposing the one side of the regulating membrane portion in the elastomer component to pressure prevailing from the water supply conduit, after the water inlet opening is opened, allowing for water to flow to the drip emitter from the water supply conduit.

3. A drip emitter in accordance with claim 1, wherein:
   said other second side of the elastomer component is exposable to reduced water pressure after the water emerges from the throttle means, thereby inducing a change in the dimension of water flow towards the water outlet opening.

4. A drip emitter in accordance with claim 3, wherein:
   said regulating membrane portion is movable towards the water outlet opening.

5. A drip emitter in accordance with claim 1, wherein:
   said regulating membrane portion is movable, and the other second side of the elastomer component is exposable to reduced pressure when water passes through the throttle means thereby inducing a change in the dimension of water flow at the throttle means.

6. A drip emitter in accordance with claim 1, wherein:
   at least a sector from the throttle means is formed in the regulating membrane with one side exposable to water pressure prevailing in the water supply conduit and a second side exposable to reduced pressure while water passes through the throttle means, so that the regulating membrane is movable in order to change in the dimension of water flowing through the throttle means.

7. A drip emitter in accordance with claim 1, wherein:
   the regulating membrane portion and the membrane portion that forms a seal for the non-drain valve are difference from one another in at least one of the following categories:
   shape;
   size of surface area;
   thickness;
   shape of the cross section; and
   distance from edge to elastomer component;
   thereby imparting different stretching and bending characteristics unto the regulating membrane portion and the membrane portion that forms a seal for the non-drain valve.

* * * * *